(12) United States Patent
Yang et al.

(10) Patent No.: US 8,497,454 B2
(45) Date of Patent: Jul. 30, 2013

(54) INDUCTION HARDENING MONITORING APPARATUS

(75) Inventors: Yue Yang, Kanagawa (JP); Fumiaki Ikuta, Kanagawa (JP); Taichi Kitamura, Aichi (JP)

(73) Assignee: Neturen Co., Ltd., Tokyo (JP)

( * ) Notice: Subject to any disclaimer, the term of this patent is extended or adjusted under 35 U.S.C. 154(b) by 472 days.

(21) Appl. No.: 12/677,709

(22) PCT Filed: Sep. 10, 2008

(86) PCT No.: PCT/JP2008/066360
§ 371 (c)(1),
(2), (4) Date: May 25, 2010

(87) PCT Pub. No.: WO2009/035011
PCT Pub. Date: Mar. 19, 2009

(65) Prior Publication Data
US 2010/0258553 A1    Oct. 14, 2010

(30) Foreign Application Priority Data
Sep. 13, 2007  (JP) .................... 2007-238523
Nov. 26, 2007  (JP) .................... 2007-305121

(51) Int. Cl.
*H05B 6/10* (2006.01)
(52) U.S. Cl.
USPC .......................... 219/602; 219/663
(58) Field of Classification Search
USPC ............ 219/602, 601, 608, 663; 266/80, 266/90, 103; 324/203; 148/420
See application file for complete search history.

(56) References Cited

U.S. PATENT DOCUMENTS 3,743,808 A   7/1973  Kasper
5,126,522 A   6/1992  Katayama et al.
(Continued)

FOREIGN PATENT DOCUMENTS

CN   1514027 A      7/2004
DE   101 43 652 A1  4/2002
(Continued)

OTHER PUBLICATIONS

European Search Report dated Feb. 16, 2011, in a counterpart European patent application No. 08831064.4 for Examiner consideration, citing U.S. Patent No. 1 and U.S. Patent Application Publication Nos. 1-3, and Foreign Patent document Nos. 1-4 and listed above and JP2000-150126, which has been submitted in a previous IDS.

(Continued)

*Primary Examiner* — Caridad Everhart
(74) *Attorney, Agent, or Firm* — Chen Yoshimura LLP

(57) ABSTRACT

An induction hardening monitoring apparatus (20) comprising: a current sensor (21) for detecting output current from a high-frequency inverter (11); a voltage sensor for detecting a voltage generated in a heating coil (14) connected between output terminals of the high-frequency inverters (11) together with a capacitor (12) in an equivalent circuit manner; and a controller (23) for monitoring a hardening processing based on a detection signal from the current sensor (21) and a detection signal from a voltage sensor (22), wherein the controller (23) monitors a hardening processing by calculating an effective value of output current from the high-frequency inverter (11) based on a detection signal from the current sensor (21) and calculating an effective value of voltage generated in a heating coil (14) based on a detection signal from the voltage sensor (22); or further calculating load impedance based on each effective value.

10 Claims, 24 Drawing Sheets

U.S. PATENT DOCUMENTS

| | | | |
|---|---|---|---|
| 5,630,957 A * | 5/1997 | Adkins et al. | 219/665 |
| 6,163,019 A | 12/2000 | Green et al. | |
| 2001/0015352 A1 * | 8/2001 | Ohishi et al. | 219/662 |
| 2006/0102620 A1 * | 5/2006 | Frankfurt | 219/663 |
| 2006/0237450 A1 | 10/2006 | Uchida et al. | |
| 2007/0000916 A1 | 1/2007 | Tanaka et al. | |
| 2007/0000917 A1 | 1/2007 | Schmitt et al. | |

FOREIGN PATENT DOCUMENTS

| | | |
|---|---|---|
| JP | 62-147689 A | 7/1987 |
| JP | 3-49561 A | 3/1991 |
| JP | 7-211440 A | 8/1995 |
| JP | H09-260049 A | 10/1997 |
| JP | 2000-150126 A | 5/2000 |
| JP | 2001-23762 A | 1/2001 |
| JP | 2002-151246 A | 5/2002 |
| JP | 2002-317224 A | 10/2002 |
| JP | 2002-538587 A | 11/2002 |
| JP | 2003-231923 A | 8/2003 |
| JP | 2005 054246 A | 3/2005 |
| JP | 2007 014145 A | 1/2007 |
| WO | 00/51410 A2 | 9/2000 |
| WO | 2005/081585 A1 | 9/2005 |
| WO | 2005/107324 A1 | 11/2005 |

OTHER PUBLICATIONS

International Search Report (ISR) for PCT/JP2008/066360 for Examiner consideration, citing U.S. Patent No. 1, U.S. Patent Application No. 1, and Foreign Patent Document Nos. 1-5 listed above.

Written Opinion (PCT/ISA/237) issued in PCT/JP20081066360 (parent application) mailed in Dec. 2008.

Chinese Office Action dated Dec. 31, 2010, in a counterpart Chinese patent application No. 200880107054.0. Concise explanation of relevance: the Chinese Office Action rejects claims in the Chinese application in view of Foreign Patent document No. 1 above.

Chinese Office Action dated Jun. 21, 2011, in a counterpart Chinese patent application No. 200880107054.0. Concise explanation of relevance: the Chinese Office Action rejects claims in the Chinese application in view of Foreign Patent document No. 1 above.

* cited by examiner

INDUCTION HARDENING MONITORING APPARATUS

TECHNICAL FIELD

The present invention relates to an induction hardening monitoring apparatus that monitors whether an induction hardening processing to a work is appropriately performed or not.

BACKGROUND ART

In order to improve the property of a work such as hardness, the work is subjected to a hardening processing by high-frequency power. FIG. 24 is an appearance diagram schematically illustrating a general hardening processing. For example, a work 50 to be heated is configured, as shown, to have an extension portion 52 at a bar-like base portion 51 in a coaxial manner. Thus, the bar-like base portion 51 and the extension portion 52 form a substantially L-like cross section. A heating coil 61 is a saddle-type coil. The heating coil 61 is adapted to connect both ends of a semicircular portion 61a with a pair of straight portions 61b, 61b. In order to perform a hardening processing, a retention means which is not shown is firstly allowed to retain the work 50. Then, the heating coil 61 is placed over the work 50 so that the semicircular portion 61a of the heating coil 61 is positioned at the upper face-side of the extension portion 52 and the straight portion 61b of the heating coil 61 is positioned to be parallel with a bar-like base portion 51. In this arrangement, whether the distance between the heating coil 61 and the extension portion 52 is within a predetermined range or not is confirmed. Thereafter, while the work 50 is being rotated, high-frequency power is inputted from a high-frequency inverter 62 to the heating coil 61, thereby subjecting the work to a hardening processing. The reference numeral 63 in the drawing denotes a matching capacitor constituting a parallel resonance circuit with the heating coil 61.

A known induction hardening apparatus used in a hardening processing has an equivalent circuit configuration in which output terminals of a high-frequency inverter have therebetween a matching capacitor and a heating coil that are connected in parallel. In order to assure the hardening quality, it is ideal that the effective power (kW) inputted to the heating coil is preferably actually measured for the control based on this effective power as a reference. The equivalent circuit of a heating coil is represented by a serial connection of inductance and resistance. Furthermore, the work heated by the heating coil functions as a resistance load. A method of monitoring the effective power is a method to measure the phase difference between the voltage ($V_{coil}$) generated at both ends of the heating coil and the coil current ($I_{coil}$) flowing in the heating coil to calculate the effective power based on the formula $P_{kw} = \cos \Phi V_{coil} I_{coil}$. In the formula, $\cos \Phi$ represents a power factor ($\Phi$ represents a power factor angle).

However, in the case of an induction hardening, many loads have a low power factor and the phase difference between the coil voltage and the coil current as a measurement target is high. Specifically, a parallel circuit of a capacitor and a heating coil has Q of about 10. The power factor may be assumed as a reciprocal number of Q. When Q is 10, the power factor is 0.1 and the power factor angle cp is 84 degrees. Thus, the resultant effective power is small that is calculated by measuring $V_{coil}$ and $I_{coil}$ to integrate these values by an arithmetic circuit. Since this arithmetic circuit is easily influenced by the temperature drift and the fluctuation of a frequency and a phase difference, the current situation is that the effective power of the induction hardening processing cannot be accurately monitored based on the calculation value by the arithmetic circuit.

Patent Document 1: Japanese Published Unexamined Patent Application No. 2002-317224
Patent Document 2: Japanese Published Unexamined Patent Application No. 2000-150126
Patent Document 3: Japanese Published Unexamined Patent Application No. 2003-231923

DISCLOSURE OF INVENTION

Problems to be Solved by the Invention

In view of the above, when an output control is performed so as to provide a constant output voltage from a high-frequency oscillator, a conventional method has been considered to detect the current of a heating coil to calculate an average current for power monitoring (e.g., Patent Document 1). However, the coil current, to be exact, has an inductance component of the coil and a resistance component. Thus, even when the load fluctuates, the coil current has a small fluctuation, thus causing a low sensitivity. This consequently prevents an effective power monitoring.

Another conventional method has been considered to perform the monitoring by detecting an output voltage and output current from the high-frequency inverter or by detecting the output power (e.g., Patent Documents 2 and 3). This detection of the output power includes the detection of an output voltage and output current to multiply the effective values thereof. However, this method is to monitor the output power from the high-frequency inverter, i.e., effective power inputted to the load when seen from between the output terminals of the high-frequency inverter. Thus, this method is influenced by the loss in a matching circuit and the power transmission loss. This method cannot sensitively detect the load fluctuation and has a low sensitivity. When a distance from the high-frequency inverter to the heating coil is long in particular, the power transmission loss causes a decreased sensitivity at which the load fluctuation is detected.

On the other hand, when the positional relation between the work as a hardening target and the heating coil deviates from a predetermined range, another disadvantage is caused, that is, the load fluctuation generates to prevent an appropriate hardening processing. This will be described specifically below. In the hardening processing shown in FIG. 24, the work 50 does not always have an identical size and has a size within a certain allowable range. Thus, there is a possibility where the positional relation between the work 50 and the heating coil 61 may be different depending on every work. In spite of this, an appropriate hardening processing is not assured even when the same high-frequency power is inputted regardless of the work 50. Specifically, as to the positional relation between the work 50 and the heating coil 61, when the gap between the work 50 and the heating coil 61 increases, that is, when the distance between the upper face 53 of the extension portion 52 and the semicircular portion 61a of the heating coil 61 increases, it is hard to input a high frequency wave to the work 50. This causes a current situation where every work cannot have an assured hardening processing quality.

In view of the above problems, it is an objective of the present invention to provide an induction hardening monitoring apparatus which has a high sensitivity for detecting a load fluctuation and which can accurately perform the quality control of an induction hardening processing.

Means for Solving the Problems

In order to achieve the above objective, the induction hardening monitoring apparatus of the present invention can be connected to an induction hardening apparatus in which a high-frequency inverter is connected to a capacitor and a heating coil. The induction hardening monitoring apparatus of the present invention includes: a current sensor for detecting output current from the high-frequency inverter; a voltage sensor for detecting a voltage generated in the heating coil; and a controller for monitoring a hardening processing based on a detection signal from the current sensor and a detection signal from the voltage sensor.

This will be described specifically below. In the first configuration of the present invention, in particular the high-frequency inverter is parallely connected to the capacitor and the heating coil. This configuration allows, when high-frequency power is inputted from the high-frequency inverter via the capacitor to the heating coil, the output voltage from the high-frequency inverter to be controlled to be constant. Thus, the fluctuation of the output power from the high-frequency inverter has a direct influence on the output current. Thus, by monitoring this output current, the output power from the high-frequency inverter can be monitored in the induction hardening processing. On the other hand, by monitoring the voltage generated in the heating coil, the detection sensitivity is increased due to the transmission loss from the high-frequency inverter to the heating coil and the matching loss by the parallel resonance circuit of the capacitor and the heating coil. Thus, the voltage fluctuation of the heating coil can be detected accurately.

In particular, the controller may include a current measurement circuit for calculating an effective value of the output current from the high-frequency inverter based on the detection signal from the current sensor, and a voltage measurement circuit for calculating an effective value of the voltage generated in the heating coil based on the detection signal from the voltage sensor, wherein the controller monitors a hardening processing based on the effective values calculated by the current measurement circuit and the voltage measurement circuit, respectively. The monitoring of the respective effective values enables easy monitoring of the output power.

In particular, the controller may include a determination unit for determining whether effective values calculated by the current measurement circuit and the voltage measurement circuit, respectively, are within a set range or not. As a result, when the determination unit determines that the effective values calculated by the current measurement circuit and the voltage measurement circuit, respectively, are not within a set range, a warning signal also can be outputted to the outside. Thus, an abnormal induction hardening processing also can be detected.

In the second configuration of the present invention, in particular, the controller calculates a load impedance based on the detection signal from the current sensor and the detection signal from the voltage sensor and monitors a hardening processing based on the calculated load impedance. As a result, when high-frequency power is inputted from the high-frequency inverter via the capacitor to the heating coil so that the output power of the high-frequency inverter is controlled to be constant, and when the positional relation between the work as a hardening target and the heating coil deviates from the allowable range, the fluctuation of the load impedance becomes out of the allowable range. Thus, a monitoring of this load impedance ensures the quality of the induction hardening processing.

In particular, the controller includes a current measurement circuit for calculating an effective value of the output current from the high-frequency inverter based on the detection signal from the current sensor, and a voltage measurement circuit for calculating an effective value of the voltage generated in the heating coil based on the detection signal from the voltage sensor; and the controller may calculate a load impedance based on the effective values calculated by the current measurement circuit and the voltage measurement circuit, respectively. As a result, by allowing the controller to calculate the load impedance based on the effective value to monitor this load impedance, the hardening monitoring can be performed easily and immediately.

In particular, the controller includes a determination unit for determining whether the calculated load impedance is within a set range or not. As a result, when the determination unit determines that the calculated load impedance is not within the set range, a warning signal can be outputted to the outside and an abnormal induction hardening processing can be detected.

The controller may calculate output current from the high-frequency inverter based on the detection signal from the current sensor and monitor a hardening processing based on the calculated output current. By allowing the controller to monitor the output current from the high-frequency inverter, a normal induction hardening processing can be confirmed based on the output value from the high-frequency inverter.

Effects of the Invention

According to the present invention, by monitoring, during an induction hardening, the output current from the high-frequency inverter and the voltage generated at both ends of the heating coil, whether the induction hardening processing is performed normally or not can be monitored, thus assuring the quality of the induction hardening. Furthermore, whether the induction hardening processing is performed normally or not can be monitored by monitoring, during an induction hardening, the load impedance, i.e., the value obtained by dividing the heating coil voltage by the output current from the high-frequency inverter, thus assuring the quality of the induction hardening.

BRIEF DESCRIPTION OF DRAWINGS

FIG. 4(A) is an equivalent circuit diagram of a modeled induction heating. FIG. 4(B) is an equivalent circuit diagram when no work exists. FIG. 4(C) is a diagram illustrating an equivalent circuit of FIG. 4(B) with a parallel circuit.

FIG. 6(A) shows a signal waveform corresponding to the voltage in the heating coil. FIG. 6(B) shows a signal waveform corresponding to the output current from the high-frequency inverter.

FIG. 7(A) shows a signal waveform corresponding to the voltage in the heating coil. FIG. 7(B) shows a signal waveform corresponding to the output current from the high-frequency inverter.

FIG. 8(A) shows a signal waveform corresponding to the voltage in the heating coil. FIG. 8(B) shows a signal waveform corresponding to the output current from the high-frequency inverter.

FIG. 9(A) shows a signal waveform corresponding to the voltage in the heating coil. FIG. 9(B) shows a signal waveform corresponding to the current of the primary-side of the current transformer 13 shown in FIG. 1.

FIG. 10(A) shows a signal waveform corresponding to the voltage in the heating coil. FIG. 10(B) shows a signal waveform corresponding to the current of the primary-side of the current transformer 13 shown in FIG. 1.

FIG. 16(A) is a diagram showing a waveform of the load impedance. FIG. 16(B) is a diagram showing a waveform of the output current.

FIG. 17(A) is a diagram showing a waveform of the load impedance. FIG. 17(B) is a diagram showing a waveform of the output current.

FIG. 22(A) is a diagram showing the waveform of the coil voltage.

FIG. 22(B) is a diagram showing the waveform of the output current.

FIG. 23(A) is a diagram showing the waveform of the coil voltage.

FIG. 23(B) is a diagram showing the waveform of the output current.

EXPLANATION OF REFERENCE NUMERALS

| | |
|---|---|
| 1: | Induction hardening system; |
| 10: | Induction hardening apparatus; |
| 11: | High-frequency inverter; |
| 12: | Matching capacitor; |
| 13: | Current transformer; |
| 13a: | Primary current-side coil; |
| 13b: | Secondary current-side coil; |
| 14: | Heating coil; |
| 15: | Work (to-be-heated object); |
| 20: | Induction hardening monitoring apparatus (impedance monitoring apparatus); |
| 21: | Current sensor; |
| 22: | Voltage sensor; |
| 22a, 22b, 22c, and 22d: | End portion; |
| 23: | Control unit; |
| 23a: | Current detection unit; |
| 23b: | Voltage detection unit; |
| 23c: | Signal processing unit; |
| 23d: | Determination unit; |
| 23e: | Display unit; |
| 24: | Warning unit; |
| 30: | Voltage measurement circuit; |
| 31: | First operational amplifier; |
| 32: | Second operational amplifier; |
| 33: | Filter circuit; |
| 34: | Input resistance; |
| 35: | First diode; |
| 36: | Second diode; |
| 37, 38, 39, 40, and 41: | Resistance; |
| 42: | Capacitor; |
| 50: | Work; |
| 51: | Bar-like base portion; |
| 52: | Extension portion; |
| 53: | Upper face; |
| 61: | Heating coil; |
| 61a: | Semicircular portion; and |
| 61b: | Straight portion |

BEST MODES FOR CARRYING OUT THE INVENTION

The following section will describe the best mode of the present invention with reference to the attached drawings.

First Embodiment

Figure 1:
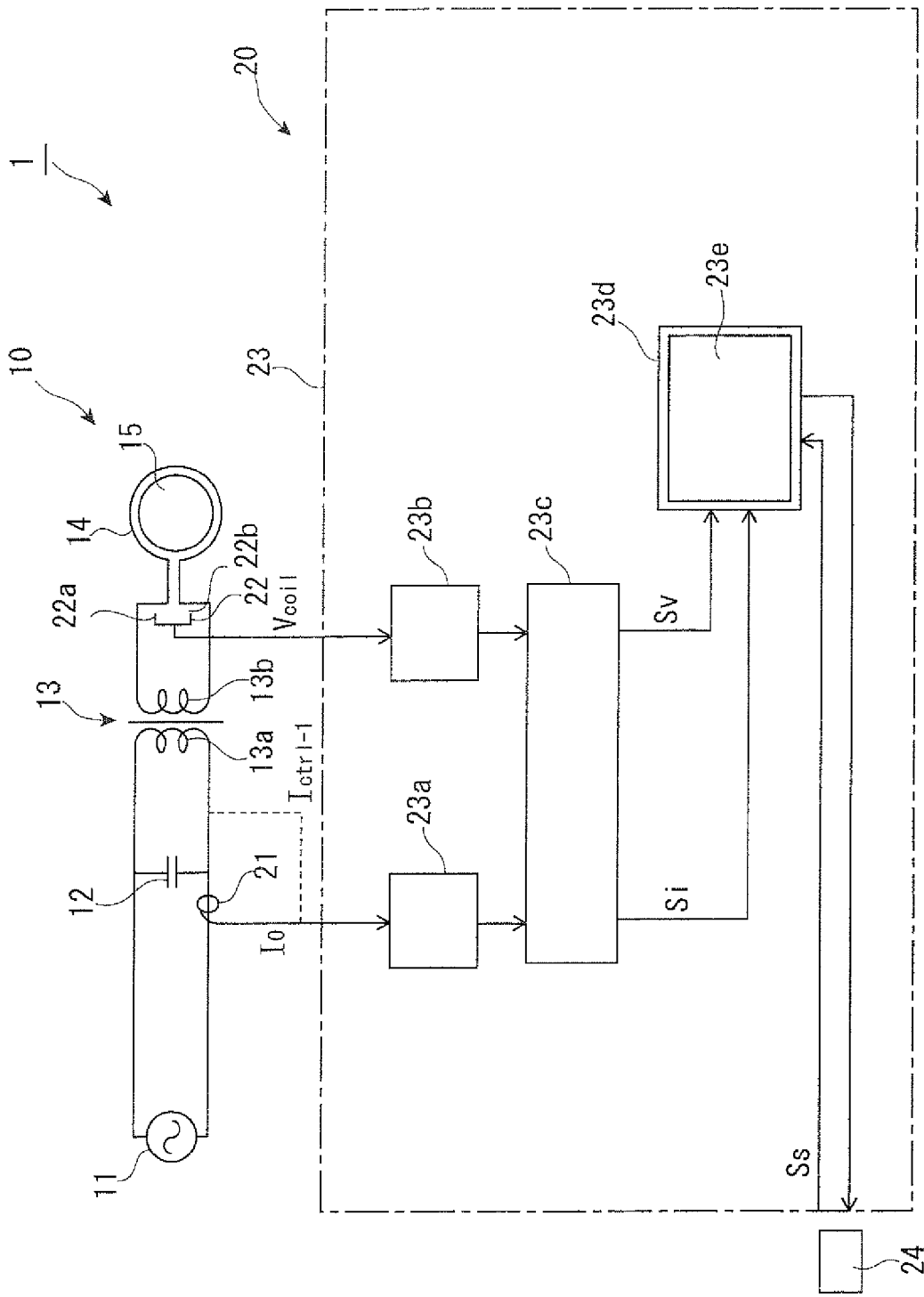
FIG. 1 is a configuration diagram of an induction hardening system including an induction hardening monitoring apparatus according to an embodiment.

An induction hardening monitoring apparatus according to the first embodiment assures the quality of an induction hardening by monitoring the output current from a high-frequency inverter and voltages generated at both ends of a heating coil. FIG. 1 is a diagram showing the configuration of an induction hardening system including an induction hardening monitoring apparatus according to the first embodiment. An induction hardening system 1 comprises an induction hardening apparatus 10 and an induction hardening monitoring apparatus 20.

The induction hardening apparatus 10 has an electric circuit configuration composed of a high-frequency inverter 11, a matching capacitor 12 connected between the output terminals of the high-frequency inverter 11, a heating coil 14 for subjecting a work 15 to an induction heating, and a current transformer 13 provided between the matching capacitor 12 and the heating coil 14. Thus, the induction hardening apparatus 10 has an equivalent circuit configuration that includes the matching capacitor 12 and the heating coil 14 including a parallel resonance circuit.

The high-frequency inverter 11 is a current-fed inverter and is controlled so that the output voltage remains constant. The current transformer 13 has a primary coil 13a parallely connected to the matching capacitor 12 with regard to the high-frequency inverter 11 and a secondary coil 13b parallely connected to the heating coil 14.

According to the induction hardening apparatus 10, by supplying high-frequency current from the high-frequency inverter 11 to the heating coil 14 while the work 15 is being placed in a receiving unit (not shown) including the heating coil 14, eddy current is caused in the work 15 to thereby heat the work 15 to perform a hardening processing.

The induction hardening monitoring apparatus 20 includes: a current sensor 21 for detecting the output current from the high-frequency inverter 11; a voltage sensor 22 for detecting the voltage in the heating coil 14; a controller 23 for monitoring a hardening processing based on the detection signal from the current sensor 21 and the detection signal from the voltage sensor 22; and the warning unit 24 for inputting various pieces of control information to the controller 23 and for receiving a warning signal from the controller 23.

The current sensor 21 is electrically connected to a wiring of the high-frequency inverter 11 and the matching capacitor 12 and detects the output current $I_o$ of the high-frequency inverter 11. The voltage sensor 22 has both ends including the terminals 22a and 22b that are parallely connected to the heating coil 14 to detect the voltage $V_{coil}$ of the heating coil 14.

The controller 23 includes: the current detection unit 23a for receiving an input of a detection signal from the current sensor 21; the voltage detection unit 23b for receiving an input of a detection signal from the voltage sensor 22; the signal processing unit 23c for receiving an input from the current detection unit 23a and the voltage detection unit 23b to subject the inputs to a signal processing, respectively; and the determination unit 23d for receiving the input of the signal processing by the signal processing unit 23c to determine whether the result is within a predetermined range or not. The determination unit 23d includes the display unit 23e for outputting the result of the signal processing by the signal processing unit 23c.

The current sensor 21 and the current detection unit 23a may be configured by a current transfer (current transformer) for converting the detected current to a voltage. A Rogowski coil can be used for the current sensor 21. The current detection unit 23a converts the voltage generated in the Rogowski coil to a voltage within a predetermined range. The current transfer converts the output current of 500 $A_{rms}$ to 0.5$V_{rms}$ for example.

The voltage sensor 22 and the voltage detection unit 23b may be configured by a potential transfer (transformer) for converting the detected voltage to a voltage within a predetermined range. In this case, the voltage sensor 22 can use a probe that can be connected between the terminals of the heating coil 14. The voltage detection unit 23b converts the voltage extracted by the probe to a voltage within a predetermined range. The potential transfer converts the coil voltage of 200$V_{rms}$ to 10$V_{rms}$ for example.

The signal processing unit 23c rectifies the signals from the current detection unit 23a and the voltage detection unit 23b respectively to calculate effective values and removes noise by filters to thereby output the current signal $S_i$ and the voltage signal $S_v$ to the determination unit 23d. Thus, the signal from the current transfer e.g., a signal of 0.5$V_{rms}$ is converted to a voltage signal of 5V, while the signal from the potential transfer e.g., a signal of 10$V_{rms}$ is converted to a voltage signal of 5V.

The determination unit 23d determines whether the current signal $S_i$ and the voltage signal $S_v$ inputted from the signal processing unit 23c are appropriate or not. That is, by receiving the heating synchronization signal $S_s$ from a controller (not shown) for controlling the high-frequency inverter 11, the determination unit 23d extracts the waveforms of the current signal $S_i$ and the voltage signal $S_v$. Then, the determination unit 23d displays the waveforms on the display unit 23e together. In this case, the determination unit 23d displays upper-limit and lower-limit threshold values that are set in advance. This allows the determination unit 23d to determine, when the current signal $S_i$ and the voltage signal $S_v$ are higher than the upper-limit threshold value or lower than the lower-limit threshold value during the operation of the induction hardening apparatus 10, that the determination is not fine to thereby record the waveform as an abnormal waveform. The determination unit 23d outputs a warning signal to the warning unit 24. The output of a warning signal may be performed by performing a warning display of "Not Fine" on the display unit 23e.

The warning unit 24 performs a warning display based on the warning signal from the determination unit 23d, generates warning sound to the outside, or instructs a controller (not shown) of the high-frequency inverter 11 to stop the output of high-frequency power.

The following section will describe a circuit configuration in the signal processing unit 23c of FIG. 1. The signal processing unit 23c includes a current measurement circuit for processing a signal from the current detection unit 23a and a voltage measurement circuit for processing a signal from the voltage detection unit 23b. The current measurement circuit and the voltage measurement circuit have a similar circuit configuration. Therefore, the voltage measurement circuit will be described below.

Figure 2:
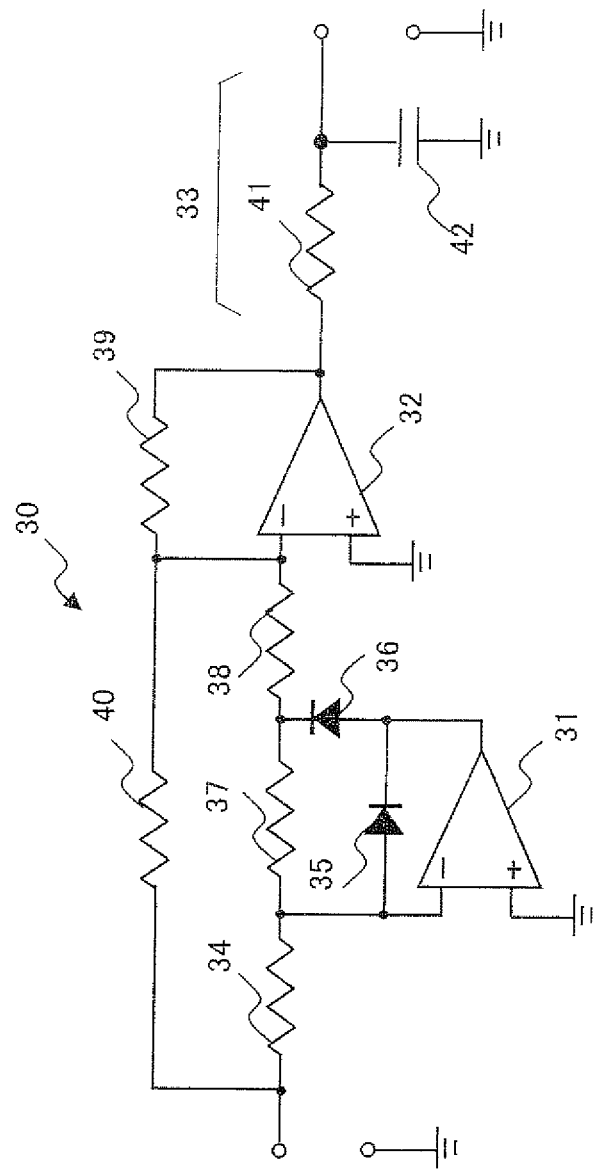
FIG. 2 shows a voltage measurement circuit in a signal processing unit in FIG. 1.

FIG. 2 is a diagram showing a voltage measurement circuit 30 in the signal processing unit 23c in FIG. 1.

The voltage measurement circuit 30 is structured so that the first operational amplifier 31 and the second operational amplifier 32 are cascade-connected and the output-side is connected to a filter circuit 33. The first operational amplifier 31 is connected to input resistance 34, a first diode 35 connected to an input terminal and an output terminal, a second diode 36 having one end connected to an output terminal, and resistance 37 having one end connected to an input terminal and the other end connected to the other end of the second diode 36. This first operational amplifier 31 is a so-called ideal diode and performs a half-wave rectification of an input signal voltage. The first operational amplifier 31 and the second operational amplifier 32 are connected by resistance 38. The second operational amplifier 32 is an inverting amplifier in which resistance 39 is connected between an input terminal and an output terminal. The second operational amplifier 32 has an input terminal connected to the input signal-side of the input resistance 34 via resistance 40. The output from the second operational amplifier 32 is a waveform obtained by subjecting the input voltage signal to a full wave rectification. This full wave rectification waveform is inputted to the low pass-type filter circuit 33 composed of the resistance 41 and a capacitor 42. Then, the ripple of the full wave rectification waveform is removed and the full wave rectification waveform is converted to a DC voltage. By setting the value of the resistance 41 and the capacitor 42 of the filter circuit 33, the effective value of the wave by the full wave rectification outputted from the second operational amplifier 32 is obtained.

The following section will describe a hardening monitoring by the induction hardening system 1 shown in FIG. 1.

In the induction hardening apparatus 10, the high-frequency inverter 11 inputs high-frequency power to the heating coil 14 via the matching capacitor 12 and the current transformer 13. As a result, the work 15 placed in the heating coil 14 is heated and is subjected to an induction hardening. Then, in the induction hardening monitoring apparatus 20, the current sensor 21 detects the output current $I_o$ from the high-frequency inverter 11 and the voltage sensor 22 detects the voltage $V_{coil}$ of the heating coil 14.

The current detection unit 23a and the voltage detection unit 23b of the controller 23 adjusts the levels of the respective detection signals from the current sensor 21 and the voltage sensor 22 respectively and outputs the current signal $S_i$ and the voltage signal $S_v$ to the signal processing unit 23c. Then, the signal processing unit 23c rectifies the current signal and the voltage signal inputted from the current detection unit 23a and the voltage detection unit 23b respectively to calculate effective values and outputs the effective values as the current signal $S_i$ and the voltage signal $S_v$ to the determination unit 23d.

The determination unit 23d synchronizes the current signal $S_i$ and the voltage signal $S_v$ from the signal processing unit 23c based on the heating synchronization signal $S_s$ to determine the waveforms. Then, the determination unit 23d compares the current signal $S_i$ and the voltage signal $S_v$ with the upper-limit and lower-limit threshold values to determine whether the current signal $S_i$ and the voltage signal $S_v$ are higher than the upper-limit threshold value or not and whether the current signal $S_i$ and the voltage signal $S_v$ are lower than the lower-limit threshold value or not. When the current signal $S_i$ and the voltage signal $S_v$ deviate from the threshold value, the determination unit 23d records the waveform and outputs a warning signal to the warning unit 24.

Upon receiving the warning signal, the warning unit 24 displays a warning or generates warning sound. Thus, upon recognizing the warning display or the warning sound, a worker performing a hardening can notice that abnormality is caused in the induction hardening. The warning unit 24 may stop the output operation of the high-frequency inverter 11 of the induction hardening apparatus 10.

As described above, the current sensor 21 is used to detect the output current from the high-frequency inverter 11. The voltage sensor 22 is used to detect the voltage generated in the heating coil 14. Based on the detection signal from the current sensor 21 and the detection signal from the voltage sensor 22, a hardening processing is monitored. As a result, when high-frequency power is inputted to the heating coil 14 via the capacitor 12 from the high-frequency inverter 11 for which the output is controlled so that the output power is constant, the fluctuation of the output power from the high-frequency inverter 11 has a direct influence on the output current. Thus, by monitoring this output current by the current sensor 21, the output power from the high-frequency inverter 11 can be monitored during the induction hardening processing. On the other hand, by using the voltage sensor 22 to monitor the voltage generated in the heating coil 14, an increased detection sensitivity is obtained by the transmission loss from the high-frequency inverter 11 to the heating coil 14 and the matching loss by the parallel resonance circuit of the capacitor 12 and the heating coil 14. Thus, the fluctuation of the voltage of the heating coil 14 can be detected accurately.

That is, when the power transmission loss is small, the fluctuation rate of the output current due to a load fluctuation is higher than the fluctuation rate of the coil voltage. Thus, it is effective to monitor the output current from the high-frequency inverter 11 by the current sensor 21. When the power transmission loss is large on the other hand, the fluctuation rate of the coil voltage due to the load fluctuation is higher than the fluctuation of the output current from the high-frequency inverter 11. Thus, it is effective to monitor the coil voltage by the voltage sensor 22. On the contrary, when the output power is controlled so that the high-frequency inverter has a constant output voltage in the method described in the background art of monitoring the output current and the output voltage of the high-frequency inverter, the load fluctuation cannot be detected. This point will be described in detail below.

Figure 3:
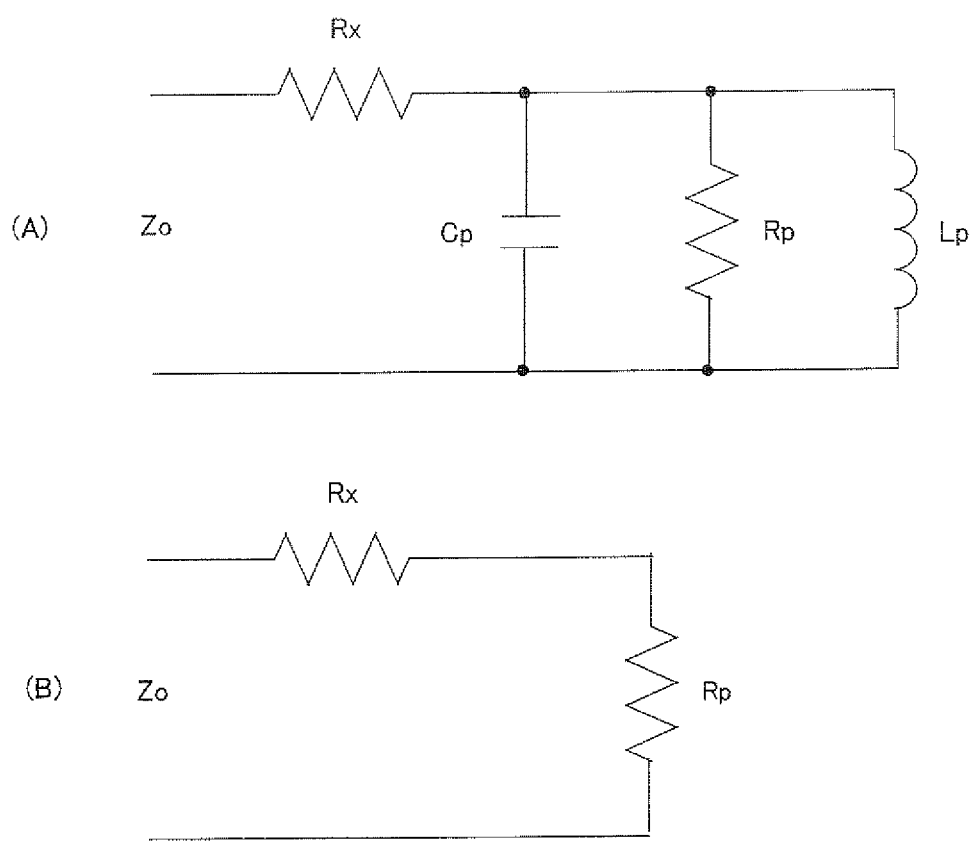
FIG. 3(A) shows a load resonance circuit.
FIG. 3(B) is an equivalent circuit diagram of the load resonance circuit shown in FIG. 3(A) when the frequency of the high-frequency inverter is synchronized with the resonance frequency of the load resonance circuit.

FIG. 3(A) shows a load resonance circuit. FIG. 3(B) is a diagram showing an equivalent circuit when the frequency of the high-frequency is synchronized with the resonance frequency of the load resonance circuit with regard to the load resonance circuit shown in FIG. 3(A). The induction heating electric circuit shown in FIG. 1 is represented, as shown in FIG. 3(A), by a circuit in which the parallel connection of the matching capacitor $C_p$, the load resistance $R_p$, and the load inductance $L_p$ is serially connected to the resistance $R_x$ including the transmission loss between the high-frequency inverter and the heating coil and the matching loss. When the frequency of the high-frequency inverter is synchronized with the frequency of the load resonance circuit in the load resonance circuit shown in FIG. 3(A), the circuit shown in FIG. 3(A) can be rewritten to the equivalent circuit shown in FIG. 3(B), i.e., a non-inductive resistance circuit. It is assumed that the resistance including the matching loss and the transmission loss between the high-frequency inverter and the heating coil is $R_x$, the load resistance is $R_p$, the output voltage from the high-frequency inverter is $V_o$=300V, and the output $I_o$=300 A. It is assumed that $R_x$ and $R_p$ are both 0.5Ω and the description will not be further provided. When the load fluctuation causes a change of the resistance $R_p$ from 0.5Ω to 0.55Ω by +10%, the output voltage controlled to be constant causes the output voltage $V_o$ to be unchanged at 300V and causes the output current $I_o$ to be changed from 300 A to 285.7 A. Thus, the change rate of the output current is also −4.8% and the output power changes by −4.8%. Then, the coil voltage $V_{coil}$ changes from 150V (=300 A×0.5Ω) to 157.1V (=285.7 A×0.55Ω), causing a change rate of the coil voltage of +4.8%. That is, the decreasing rate of the output current from the high-frequency inverter is substantially equal to the increase rate of the coil voltage.

When the resistance $R_x$ including the transmission loss and the matching loss is 0.4Ω and the load resistance $R_p$ is 0.6Ω in the above circuit configuration, a case will be considered where the change rate of the load resistance $R_p$ is +10%, i.e., the load resistance $R_p$ changes from 0.6Ω to 0.66Ω. In this case, the output voltage $V_o$ of the high-frequency inverter is unchanged at 300V and the output current $I_o$ changes from 300 A to 283.0 A. Thus, the change rate of the output current is also −5.7% and the output power changes by −5.7%. Then, the coil voltage $V_{coil}$ changes from 180V (=300 A×0.6Ω) to 186.8V (=283.0 A×0.66Ω) and the change rate of the coil voltage is about +3.8%. That is, the decrease rate of the output current from the high-frequency inverter has an absolute value that is higher than the absolute value of the increase rate of the coil voltage.

When a case is considered where the resistance $R_x$ including the transmission loss and the matching loss is 0.6Ω and the load resistance $R_p$ is 0.4Ω in the circuit configuration, the change rate of the load resistance $R_p$ is +10%, i.e., the load resistance $R_p$ changes from 0.4Ω to 0.44Ω. In this case, the output voltage $V_o$ of the high-frequency inverter is unchanged at 300V and the output current $I_o$ changes from 300 A to 288.5 A. Thus, the change rate of the output current is also −3.8% and the output power also changes by −3.8%. Then, the coil voltage $V_{coil}$ changes from 120V (=300 A×0.4Ω) to 126.9V (=288.5 A×0.44Ω) and the change rate of the coil voltage is about +5.7%. That is, the decrease rate of the output current from the high-frequency inverter has an absolute value that is lower than the absolute value of the increase rate of the coil voltage.

From the above, it can be seen that, in the case of the conventional method to monitor the output current and the output voltage of a high-frequency inverter, with an increase of the transmission loss and the matching loss, e.g., with an increase of the ratio between the resistance $R_x$ including the transmission loss and the matching loss and the load resistance $R_p$ from 0.4:0.6 through 0.5:0.5 to 0.6:0.4, the change rate of the output current $I_o$ from the high-frequency inverter changes from −5.7% through −4.8% to −3.8% and thus the output current from the high-frequency inverter does not change in proportion with the change rate of the load resistance $R_p$, thus showing a poor sensitivity to the fluctuation of the load resistance $R_p$.

In contrast with this, by monitoring as in this embodiment both of the coil voltage $V_{coil}$ and the output current $I_o$ from the high-frequency inverter, the influence by the transmission loss can be eliminated to monitor the load fluctuation. The reason is that, in the case that the ratio of the transmission loss and the matching loss is small, the fluctuation of the load resistance has a bigger influence on the change rate of the output current than on the fluctuation rate of the coil voltage and thus the monitoring of the change of the output current from the high-frequency inverter is preferred. In the case that the ratio of the transmission loss and the matching loss is large on the contrary, the fluctuation of the load resistance has a bigger influence on the fluctuation rate of the coil voltage than on the change rate of the output current and thus the monitoring of the change of the coil voltage is preferred. That is, by monitoring both of the coil voltage $V_{coil}$ and the output current $I_o$ from the high-frequency inverter, a monitoring method is established to eliminate an influence by the power loss in the circuit.

Second Embodiment

In the second embodiment, during an induction hardening, the normality of the induction hardening processing is monitored by monitoring load impedance i.e., a value obtained by dividing a heating coil voltage by output current outputted from a high-frequency inverter. An induction hardening system including a hardening monitoring apparatus according to the second embodiment has the same configuration as in the case of FIG. 1 showing the first embodiment. Specifically, the induction hardening monitoring apparatus according to the second embodiment, specifically, an induction hardening system including an impedance monitoring apparatus is composed, as shown in FIG. 1, of an induction hardening apparatus 10 and a hardening monitoring apparatus 20.

As shown in FIG. 1, the induction hardening apparatus 10 is configured so that a matching capacitor 12 and a heating coil 14 form a parallel resonance circuit in an equivalent circuit-like manner. In the second embodiment, the induction hardening apparatus 10 may be a series resonance circuit composed of a matching capacitor and a heating coil. Although the high-frequency inverter 11 is a current-fed inverter as in the first embodiment, the second embodiment is different from the first embodiment in that the high-frequency inverter 11 is driven while being controlled based on a constant power control method so that an outputted high-frequency power is constant. The second embodiment is the same as the first embodiment in that the current transformer 13 is composed of the primary coil 13a parallely connected to the matching capacitor 12 with regard to the high-frequency inverter 11 and the secondary coil 13b parallely connected to the heating coil 14.

According to the induction hardening apparatus 10, by supplying high-frequency current from the high-frequency inverter 11 to the heating coil 14 while the work 15 is being placed in a receiving unit (not shown) including the heating coil 14, eddy current is caused in the work 15 to thereby heat the work 15 to perform a hardening processing.

The hardening monitoring apparatus 20 includes: a current sensor 21 for detecting the output current from the high-frequency inverter 11; a voltage sensor 22 for detecting the voltage in the heating coil 14; a controller 23 for calculating a load impedance based on the detection signal from the current sensor 21 and the detection signal from the voltage sensor 22 to monitor a hardening processing based on this load impedance; and the warning unit 24 for inputting various pieces of control information to the controller 23 and for receiving a warning signal from the controller 23.

The current sensor 21 is electrically connected to a wiring of the high-frequency inverter 11 and the matching capacitor 12 and detects the output current $I_o$ of the high-frequency inverter 11. The voltage sensor 22 has both ends including the terminals 22a and 22b that are parallely connected to the heating coil 14 to detect the voltage $V_{coil}$ of the heating coil 14.

The controller 23 includes: the current detection unit 23a for receiving an input of a detection signal from the current sensor 21; the voltage detection unit 23b for receiving an input of a detection signal from the voltage sensor 22; the signal processing unit 23c for receiving an input from the current detection unit 23a to calculate an effective value regarding the output current and for receiving an input from the voltage detection unit 23b to calculate an effective value regarding the coil voltage; and the determination unit 23d for calculating a load impedance based on the respective effective values regarding the output current and the coil voltage calculated by the signal processing unit 23c to thereby determine whether the load impedance is within a reference interval or not. The determination unit 23d includes the display unit 23e for outputting the result of the signal processing by the signal processing unit 23c.

The current sensor 21 and the current detection unit 23a may be configured by a current transfer (current transformer) for converting the detected current to a voltage. The voltage sensor 22 and the voltage detection unit 23b may be configured by a potential transfer (transformer) for converting the detected voltage to a voltage within a predetermined range. These points are the same as those of the first embodiment.

The signal processing unit 23c rectifies the signals from the current detection unit 23a and the voltage detection unit 23b respectively to calculate effective values and uses filters to remove noise to thereby output the current signal $S_i$ and the voltage signal $S_v$ to the determination unit 23d. This point is the same as that of the first embodiment. The signal processing unit 23c includes a current measurement circuit for processing the signal from the current detection unit 23a and a voltage measurement circuit for processing the signal from the voltage detection unit 23b, respectively. The current measurement circuit and the voltage measurement circuit have the same specific configurations as those of the first embodiment. Thus, the signal from the current transfer, e.g., a signal of $0.5V_{rms}$, is converted to a voltage signal of 5V while the signal from the potential transfer, e.g., a signal of $10V_{rms}$, is converted to a voltage signal of 5V.

The determination unit 23d divides the coil voltage by the output current based on the current signal $S_i$ and the voltage signal $S_v$ inputted from the signal processing unit 23c to thereby determine whether this calculated load impedance is within a stipulated range or not. In particular, by receiving the heating synchronization signal $S_s$ from a controller (not shown) for controlling the high-frequency inverter 11, the determination unit 23d samples the values of the current signal $S_i$ and the voltage signal $S_v$ inputted from the signal processing unit 23c. Next, the determination unit 23d divides the sampled voltage value by the sampled current value and multiplies the result with a predetermined proportional constant to thereby calculate the value of the output current to the coil voltage, i.e., a load impedance. Then, the calculation result is graphically displayed on the display unit 23e during which whether the calculated load impedance is within the reference interval or not is determined. When the calculated load impedance is within the reference interval, the determination unit 23d determines that the hardening processing is fine. When the calculated load impedance is not within the reference interval, the determination unit 23d determines that the hardening processing is not fine to thereby display a warning signal to the warning unit 24.

The determination unit 23d may be configured so as to be able to output the waveform of any of the current signal $S_i$ and the voltage signal $S_v$ to the display unit 23e upon receiving the heating synchronization signal $S_s$ from a controller (not shown) of the high-frequency inverter 11. In this case, the determination unit 23d displays upper-limit and lower-limit threshold values that are set in advance. This allows the determination unit 23d to determine, when the current signal $S_i$ and the voltage signal $S_v$ are higher than the upper-limit threshold value or lower than the lower-limit threshold value during the operation of the induction hardening apparatus 10, that the determination is not fine to thereby record the waveform as an abnormal waveform.

The determination unit 23d outputs a warning signal to the warning unit 24. The output of a warning signal may be performed by performing a warning display of "Not Fine" on the display unit 23e.

The warning unit 24 performs a warning display based on the warning signal from the determination unit 23d, generates warning sound to the outside, and instructs a controller (not shown) of the high-frequency inverter 11 to stop the output of high-frequency power.

The following section will describe a hardening monitoring when the induction hardening system 1 is used to perform a hardening processing.

In the induction hardening apparatus 10, the high-frequency inverter 11 inputs high-frequency power to the heating coil 14 via the matching capacitor 12 and the current transformer 13. As a result, the work 15 placed in the heating coil 14 is heated and is subjected to an induction hardening. Then, in the induction hardening monitoring apparatus, the current sensor 21 detects the output current $I_o$ from the high-frequency inverter 11 and the voltage sensor 22 detects the voltage $V_{coil}$ of the heating coil 14.

The current detection unit 23a and the voltage detection unit 23b of the controller 23 adjust the levels of the respective detection signals from the current sensor 21 and the voltage sensor 22 respectively and output the current signal $S_i$ and the voltage signal $S_v$ to the signal processing unit 23c. Then, the signal processing unit 23c rectifies the current signal and the voltage signal inputted from the current detection unit 23a and the voltage detection unit 23b respectively to calculate effective values and outputs the respective effective current and voltage values as the current signal $S_i$ and the voltage signal $S_v$ to the determination unit 23d.

Upon receiving the current signal $S_i$ and the voltage signal $S_v$ from the signal processing unit 23c, the determination unit 23d synchronizes the current signal $S_i$ and the voltage signal $S_v$ with the heating synchronization signal $S_s$ to thereby acquire waveforms. Then, based on the respective waveforms, the determination unit 23d acquires a data sequence of the effective current value and the effective voltage value. Thereafter, the determination unit 23d divides the effective current value by the effective voltage value to thereby calculate a load impedance and determines whether the calculated load impedance is within a stipulated range or not. When the load impedance is not within the threshold value, the determination unit 23d acquires and records the data sequence and outputs a warning signal to the warning unit 24.

During this, the determination unit 23d may compare the effective current value with an upper-limit threshold value and a lower-limit threshold value to determine whether the current signal $S_i$ is higher than the upper-limit threshold value or is lower than the lower-limit threshold value. When the current signal $S_i$ deviates from the threshold value, the waveform is recorded and a warning signal is outputted to the warning unit 24. This can provide the monitoring as described later of a fluctuation in the output from the high-frequency inverter 11. The fluctuation cannot be determined by the monitoring of a load impedance.

Upon receiving the warning signal, the warning unit 24 displays a warning or generates warning sound. Thus, upon recognizing the warning display or the warning sound, a worker performing a hardening can notice that abnormality is caused in the induction hardening. The warning unit 24 may stop the output operation of the high-frequency inverter 11 of the induction hardening apparatus 10.

Figure 11:
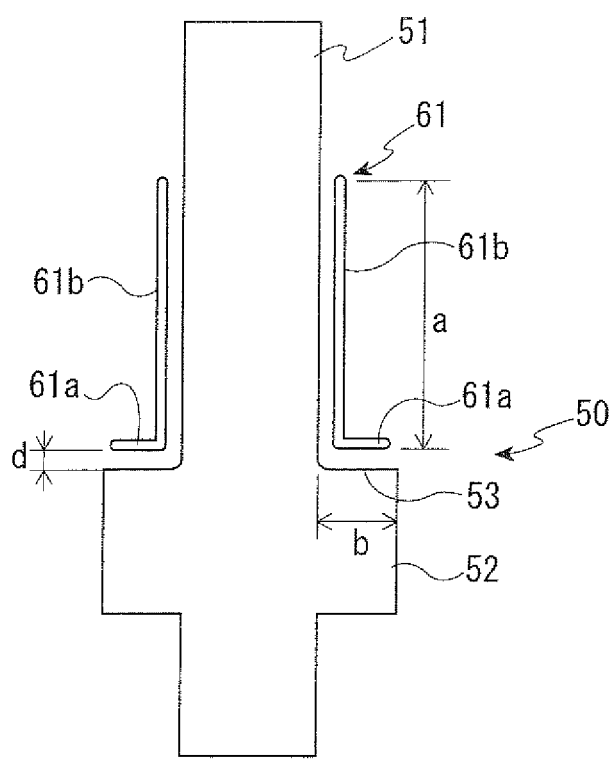
FIG. 11 is a diagram showing the positional relation between the heating coil and the work.

As described above, the current sensor 21 is used to detect the output current from the high-frequency inverter 11. The voltage sensor 22 is used to detect a voltage generated in the heating coil 14. Based on the detection signal from the current sensor 21 and the detection signal from the voltage sensor 22, the load impedance is calculated and a hardening processing is monitored based on the calculated load impedance. As a result, when high-frequency power is inputted to the heating coil 14 via the capacitor 12 from the high-frequency inverter 11 for which the output is controlled so that the output power is constant, even when the output current from the high-frequency inverter 11 has a low fluctuation rate and the coil voltage generated in the heating coil 14 has a low fluctuation rate, a deviation from a reference interval of a positional relation between a work as a hardening target and a heating coil, i.e., an increase of a gap d between the work 50 and the heating coil (hereinafter referred to as a coil gap d) as shown in FIG. 11, can be detected as a fluctuation of the load impedance. Thus, the quality control of the induction hardening processing can be performed easily and accurately.

The following section will describe the reason why the coil gap d appears as the fluctuation of the load impedance even when the output current from the high-frequency inverter 11 has a low fluctuation rate and even when the coil voltage generated in the heating coil 14 has a low fluctuation rate during an induction hardening processing.

Figure 4:
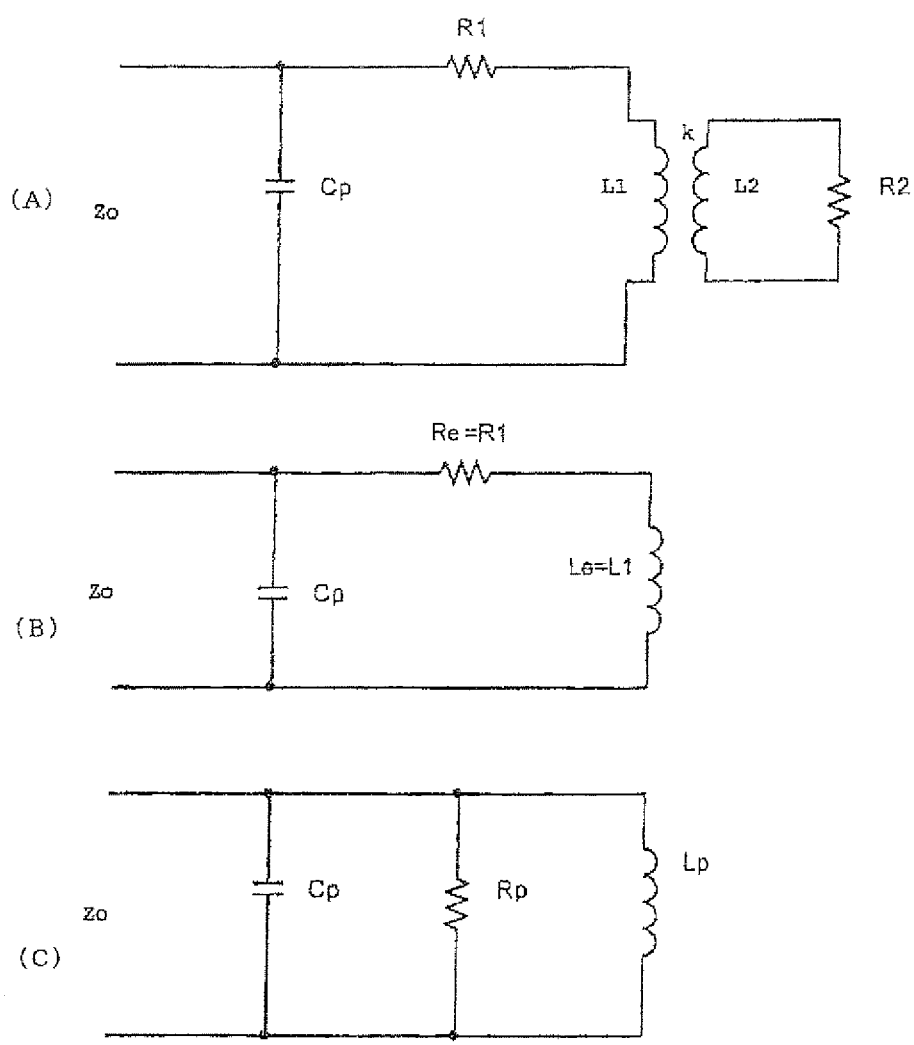
FIG. 4 is a schematic circuit diagram for explaining the reason why a coil gap fluctuation can be observed as a load impedance fluctuation.

FIGS. 4(A), 4(B), and 4(C) are a schematic circuit diagram for explaining the reason why the fluctuation of the coil gap d can be observed as a load impedance fluctuation. FIG. 4(A) is an equivalent circuit diagram illustrating a model of an induction heating. FIG. 4(B) is an equivalent circuit diagram when no work exists. FIG. 4(C) is a diagram showing the equivalent circuit shown in FIG. 4(B) as a parallel circuit.

Among the induction heating electric circuits, the electric circuit shown in FIG. 1(A) from the high-frequency inverter 11 to the heating coil 14 is shown in the point that, when a transmission loss $R_x$ is omitted, the serial connection of a resistance R1 and a self-inductance L1 is parallely connected to the matching capacitor Cp. The work 15 is shown as a parallel connection between a self-inductance L2 and a resistance R2. A situation in which the work 15 is placed in the heating coil 14 can be modeled as mutual-inductance. Here, R1 denotes a resistance component of the coil conducting wire, R2 denotes a resistance component of the heating target, L1 denotes an inductance component of the heating coil 14, L2 denotes an inductance component of the heating target, and M denotes a mutual-inductance that changes depending on the gap between the heating coil 14 and the work 15. When assuming that the coupling factor of the self-inductance L1 and the self-inductance L2 is k, the mutual-inductance M satisfies the relation of $k=M/(L1 \times L2)^{1/2}$. The load impedance seen from both ends of the matching capacitor Cp is represented by the sum of a reactance component ωLe and a resistance component Re. It is established that $Le=L1(1-k^2)$ and $Re=R1+A \cdot R2$. In the formula, A is a factor determined depending on the above-described coupling factor k, the load shape, and the heating frequency.

When the gap d between the work 15 and the heating coil 14 increases, the load coupling is reduced. An ultimate situation may be that the load coupling is reduced until k=0 and Re=R1 are reached and finally Le=L1 is reached. Specifically, the equivalent circuit of FIG. 4(A) can be rewritten as shown in FIG. 4(B).

Thus, an increase in the gap causes an increase in Le and a decrease in Re.

Furthermore, the serial equivalent circuit of FIG. 4(B) can be converted to the parallel equivalent circuit of FIG. 4(C). Since Ze=Re+jwLe is established, an admittance Ye is Ye=1/Ze and thus can be represented by the following formula.

$$Ye=Gp+jBp$$

Gp and Bp are represented by the following formulae.

$$Gp=Re/(Re^2+(\omega Le)^2)$$

$$BP=\omega Le/(Re^2+(\omega Le)^2)$$

In the formulae, Rp=1/Gp and |Xp|=1/|Bp|. Rp and |Xp| are represented by the following formulae.

$$Rp=(Re^2+(\omega Le)^2)/Re$$

$$|Xp|=(Re^2+(\omega Le)^2)/\omega Le)$$

Since $\omega Le^2 >> Re^2$ is established in a hardening application, the following formula is established.

$$Rp=(\omega Le)^2/Re$$

$$|Xp| \approx \omega Le$$

In the formulae, ω denotes an angular frequency of a high frequency outputted from the high-frequency inverter 11.

When the high-frequency inverter has a frequency that corresponds to and that is synchronized with a frequency of the load resonance circuit, the load impedance $Z_o$ can be represented as:

$$Z_o = R_p = (\omega Le)^2/Re$$

In other words, as is clear from the above approximation formula, an increase in the gap d between the work 15 and the heating coil 14 causes a decrease in the load coupling, an increase in Le, a decrease in Re, and an increase in the load impedance $Z_o$. Furthermore, the load impedance $Z_o$ has a change rate that is higher than those of Le and Re, respectively.

Therefore, when the output power from the high-frequency inverter 11 is constant and the coil gap d increases, the output current from the high-frequency inverter 11 decreases and the coil voltage increases. Thus, even when the output current has a small decrease rate and even when the coil voltage has a small increase rate, the coil voltage ratio to the output current (i.e., load impedance) increases. Thus, an increase in the coil gap d directly appears as a fluctuation of the load impedance.

As can be seen from the above, when the output power of the high-frequency inverter 11 is controlled to be constant in the induction hardening processing, the fluctuation of the load impedance is monitored by the determination unit 23d to confirm that the fluctuation of the load impedance is within the range of the upper-limit and lower-limit threshold values. By doing this, the induction hardening monitoring can be performed efficiently. Furthermore, the controller 23 preferably calculates the output current from the high-frequency inverter 11 based on the detection signal from the current sensor 21 to confirm that the fluctuation of this output current is within the range of the upper-limit and lower-limit threshold values. By doing this, whether the gap is within an allowable range or not can be confirmed by monitoring the load impedance. At the same time, the fluctuation of the output current from the high-frequency inverter 11 can be monitored to thereby confirm that energy required for the hardening is inputted, thus providing a high-quality hardening control.

The induction hardening monitoring apparatus according to the first embodiment is not limitedly applied to the induction hardening apparatus 10 shown in FIG. 1. The induction hardening monitoring apparatus according to the first embodiment can be applied to an induction hardening apparatus having an equivalent circuit configuration including a parallel resonance circuit having a matching capacitor and a heating coil and a high-frequency inverter. For example, the current transformer 13 may be omitted.

A modification example of the second embodiment will be described.

Figure 5:
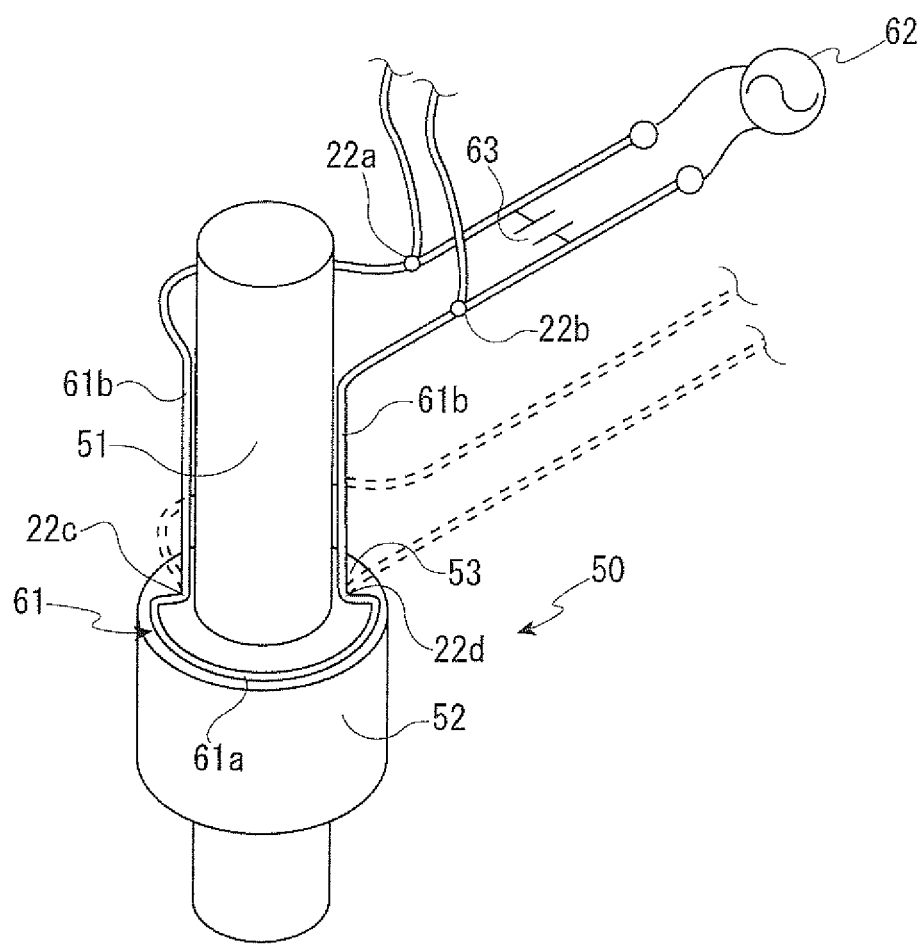
FIG. 5 is a schematic diagram for explaining a modification example of the second embodiment.
Figure 24:
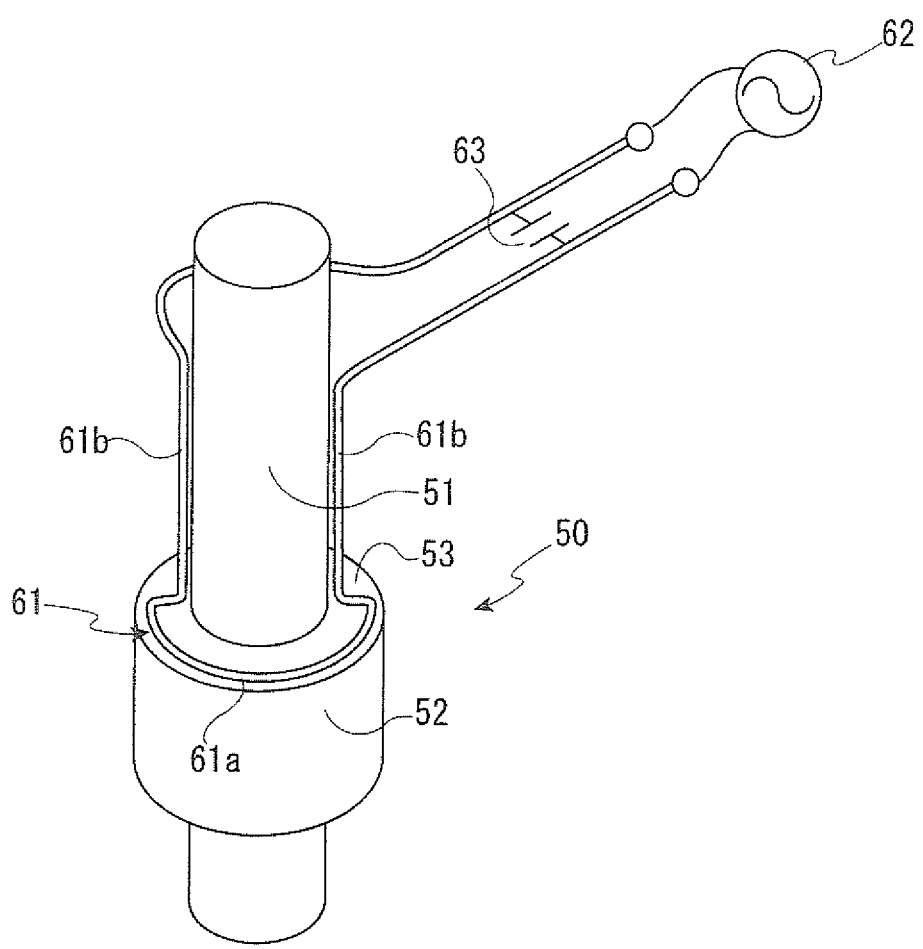
FIG. 24 is a diagram schematically showing a general hardening processing.

FIG. 5 is a schematic diagram for explaining a modification example of the present invention. The same components as those of FIG. 24 are denoted with the same reference numerals. As shown in FIG. 5, an arrangement is provided so that the voltages at both ends 22c and 22d of the semicircular portion 61a of the coil are detected as a coil voltage. As a result, the fluctuation of the coil gap d can be efficiently reflected on the load impedance.

A configuration as in this modification example is preferred where the semicircular portion 61a is provided in which the heating coil 61 is provided to have the predetermined gap d to the hardening target region of the work 50 and, as shown by the dotted line in FIG. 5, both end portions 22c and 22d of the voltage sensor 22 are connected to both ends of the semicircular portion 61a so as to detect the voltage between the both ends of the semicircular portion 61a. When this configuration where the end portions 22c and 22d of the voltage sensor 22 are connected to both ends of the semicircular portion 61a as shown by the dotted line is compared with a case where both ends 22a and 22b of the voltage sensor 22 are connected via the straight portions 61b,61b as shown by the solid line, the fluctuation rate of the coil gap can be detected with a higher sensitivity, thus providing a more accurate hardening monitoring.

From the above, when the high-frequency power is controlled to be constant, an increase of the coil gap d causes an increase of the load impedance and, based on this fluctuation of the load impedance, whether the hardening processing is performed correctly or not can be determined.

The induction hardening monitoring apparatus according to the second embodiment is not limitedly applied to the induction hardening apparatus 10 shown in FIG. 1. The induction hardening monitoring apparatus according to the second embodiment can be applied to an induction hardening apparatus having an equivalent circuit configuration including a resonance circuit having a matching capacitor and a heating coil and a high-frequency inverter. For example, the current transformer 13 may be omitted.

The following section will describe Examples 1 to 3 and Comparison Examples 1 and 2 corresponding to the first embodiment and Example 4 and Comparison Example 3 corresponding to the second embodiment.

Example 1

The induction hardening system 1 shown in FIG. 1 was used to perform a load evaluation test.

As the high-frequency inverter 11, an inverter was used for which a DC voltage was controlled to be constant to thereby output a high frequency of 25 kHz. As a parallel resonance-type load circuit, the matching capacitor 12 of 10 μF and the current transformer 13 having a turn ratio of 6:1 were used. Such a saddle-type receiving unit including therein the heating coil 14 and receiving the work 15 was used that had an inner diameter of 40 mm and a width of 4 mm. The work 15 used was a circular pipe having an outer shape of 33 mm and a thickness of 5.5 mm. In Example 1, the work 15 was placed so that the gap between an end face of the saddle-type receiving unit and the outer shape of the work has a standard value of 4 mm. The output power from the high-frequency inverter 11 was set to 50% of the set volume and the output power from the high-frequency inverter 11 was set to be outputted for 1 second. For the determination unit 23d, the reference ranges for the coil voltage $V_{coil}$ and the current $I_o$ were set in advance. In detail, the work 15 was placed in a standard status to the saddle-type receiving unit and then the work 15 was hardened. Then, the current sensor 21 and the voltage sensor 22 were used to sample the respective waveforms of the current signal $S_i$ and the voltage signal $S_v$. Then, it was confirmed that the quality is within the predetermined range. Then, the sampled waveforms were respectively assumed as reference waveforms and, along the respective reference waveforms, an upper limit and a lower limit were set for the voltage value on the vertical axis and the time on the horizontal axis. In this Example, the upper and lower limit set values for the voltage $V_{coil}$ was ±4.3% (±50 mV), the value set for the time axis was ±4.8 (±48 ms), the upper and lower limit set values for the current $I_o$ was ±3.8% (±20 mV), and the value set for the time axis was ±4.8% (±48 ms).

Figure 6:
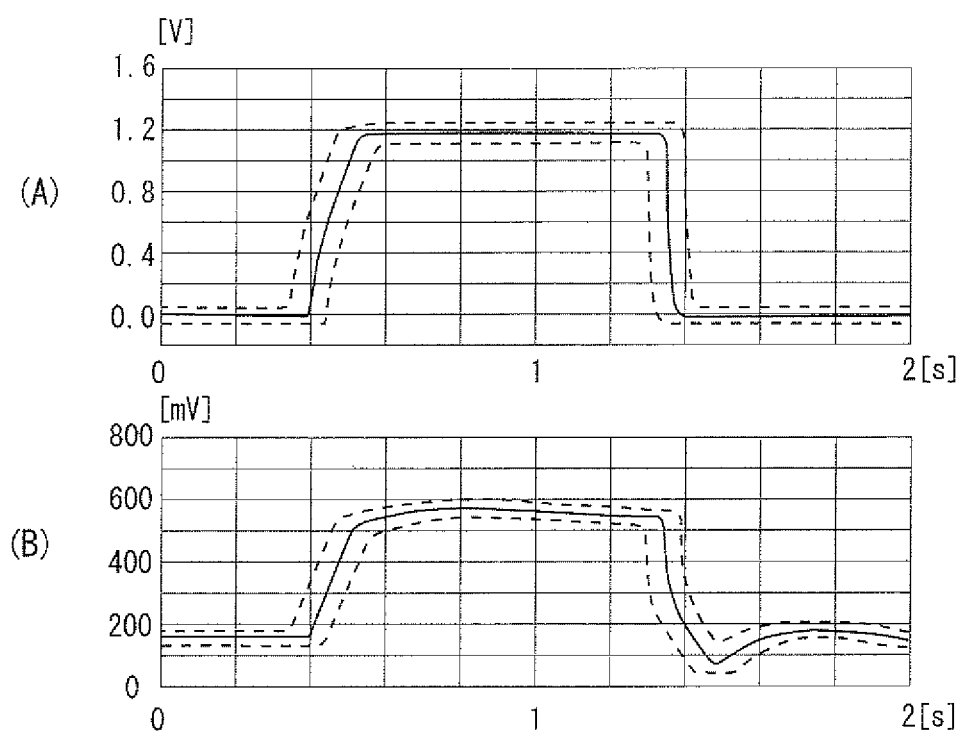
FIGS. 6(A) and 6(B) show the result of Example 1.

FIG. 6 shows the result of Example 1. FIG. 6(A) shows a signal waveform corresponding to the voltage in the heating coil 14. FIG. 6(B) shows a signal waveform corresponding to the output current from the high-frequency inverter 11. In the drawings, the solid lines represent the respective waveforms and the dotted lines represent the range of the upper-limit and lower-limit threshold values. In Example 1, the gap is 4 mm of the reference value. Thus, as can be seen from FIGS. 6(A) and 6(B), the waveform is at substantially the center of the upper-limit and lower-limit threshold values and the determination by the determination unit 23d was "fine". The output power and the output voltage from the high-frequency inverter 11 were 18 kW and 290V, respectively. The signal of the voltage $V_{coil}$ of the heating coil 14 was 1.157V (which corresponds to $V_{coil}$ of 1.157×200/5V) and the signal of the output current $I_o$ of the high-frequency inverter 11 was 0.529V (which corresponds to $I_o$ of 0.529×500/5 A).

Example 2

Example 2 had the same configuration as that of Example 1 except for that the work 15 was placed so that the gap between the end face of the saddle-type receiving unit and the outer shape of the work 15 was 6 mm.

Figure 7:
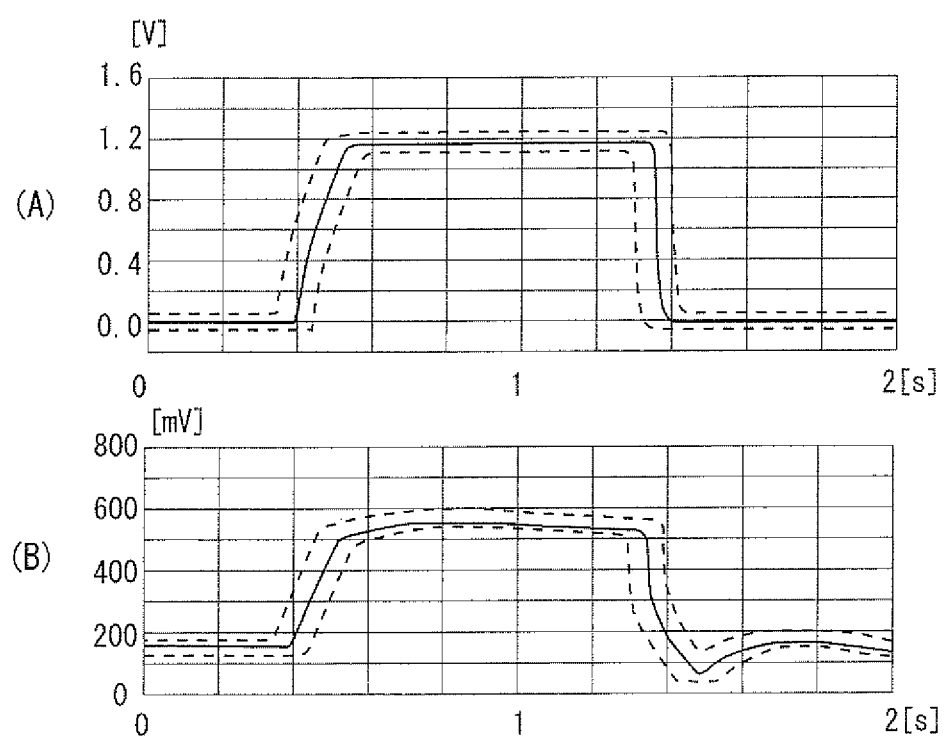
FIGS. 7(A) and 7(B) show the result of Example 2.

FIG. 7 shows the result of Example 2. FIG. 7(A) shows a signal waveform corresponding to the voltage in the heating coil 14. FIG. 7(B) shows a signal waveform corresponding to the output current from the high-frequency inverter 11. In the drawings, the solid lines represent the respective waveforms and the dotted lines represent the range of the upper-limit and lower-limit threshold values. In Example 2, the gap is wider than the reference value of 4 mm. Thus, as can be seen from FIGS. 7(A) and 7(B), although the waveform of the current was at the lower limit-side than the substantially the center of the upper-limit and lower-limit threshold values, the waveform of the current was within the range of threshold values. Thus, the determination by the determination unit 23d was "fine". The output power and the output voltage from the high-frequency inverter 11 were 18 kW and 290V, respectively. The signal of the voltage $V_{coil}$ of the heating coil 14 was 1.172V (which corresponds to $V_{coil}$ of 1.172×200/5V) and the signal of the output current $I_o$ of the high-frequency inverter 11 was 0.520V (which corresponds to $I_o$ of 0.520×500/5 A).

Example 3

Example 3 had the same configuration as that of Example 1 except for that the work 15 was placed so that the gap between the end face of the saddle-type receiving unit and the outer shape of the work 15 was 7 mm.

Figure 8:
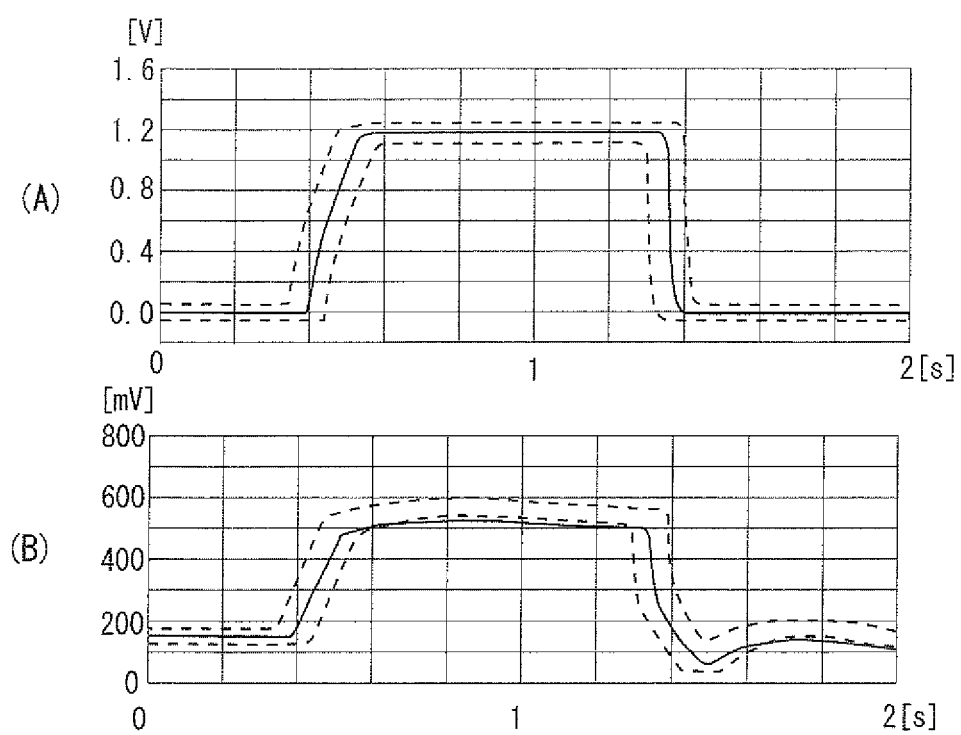
FIGS. 8(A) and 8(B) show the result of example 3.

FIG. 8 shows the result of Example 3. FIG. 8(A) shows a signal waveform corresponding to the voltage in the heating coil 14. FIG. 8(B) shows a signal waveform corresponding to the output current from the high-frequency inverter 11. In the drawings, the solid lines represent the respective waveforms and the dotted lines represent the range of the upper-limit and lower-limit threshold values. In Example 3, the gap of 7 mm is further wider than the reference value of 4 mm. Thus, as can be seen from FIGS. 8(A) and 8(B), the signal waveform of the current was partially extruded from the lower limit of the threshold value. Thus, the hardening processing is determined as "not fine". The output power and the output voltage from the high-frequency inverter 11 were 17 kW and 290V, respectively. The signal of the voltage $V_{coil}$ of the heating coil 14 was 1.162V (which corresponds to $V_{coil}$ of 1.162×200/5V) and the signal of the output current $I_o$ of the high-frequency inverter 11 was 0.500V (which corresponds to $I_o$ of 0.500×500/5 A).

Comparison Example 1

The following section will describe comparison examples.

In comparison examples, the induction hardening system 1 was configured so that the current sensor 21 connected to the wiring between the high-frequency inverter 11 and the matching capacitor 12 was connected, as shown by the broken line in FIG. 1, to the primary-side of the current transformer 13 so that the current sensor 21 detects the primary current $I_{ctrl-1}$ of the transformer.

As in examples 1 to 3, the output power from the high-frequency inverter 11 was set to 50% of the set volume and the output power from the high-frequency inverter 11 was set to be outputted for 1 second. For the determination unit 23d, the upper and lower limit set values for the voltage $V_{coil}$ were ±4.3% (±50 mV), the value set for the time axis was ±4.8 (±48 ms), the upper and lower limit set values for the current $I_o$ were ±3.8% (±125 mV), and the value set for the time axis was ±4.8% (±48 ms). The reason is that, regarding the setting of the upper and lower limit values for the current $I_o$, since the current to be measured as a target was changed from the output current $I_o$ of the high-frequency inverter 11 to the primary current $I_{ctrl-1}$ of the current transformer 13, the current value increases even when the upper and lower set values are set within the same range (%).

In Comparison Example 1, the gap between the saddle-type receiving unit and the work was set to 4 mm as in Illustrative Embodiment 1.

Figure 9:
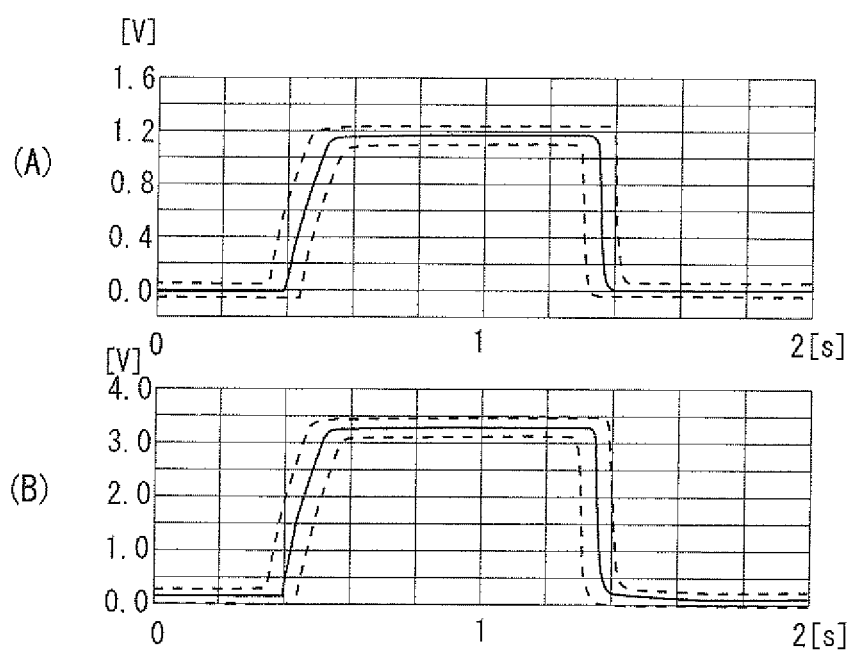
FIGS. 9(A) and 9(B) show the result of Comparison Example 1.

FIG. 9 shows the result of Comparison Example 1. FIG. 9(A) shows a signal waveform corresponding to the voltage in the heating coil 14. FIG. 9(B) shows a signal waveform corresponding to the primary-side current of the current transformer 13. In the drawings, the solid lines represent waveforms and the dotted lines represent the range of the upper-limit and lower-limit threshold values.

In Comparison Example 1, since the gap has the reference value of 4 mm, as can be seen from FIG. 9, the respective current and voltage signal waveforms are both at substantially the center of the upper-limit and lower-limit threshold values and the determination by the determination unit 23d was "fine". The output power and the output voltage from the high-frequency inverter 11 were 18 kW and 290V, respectively. The signal of the voltage $V_{coil}$ of the heating coil 14 was 1.170V (which corresponds to $V_{coil}$ of 1.170×200/5V) and the signal of the primary current $I_{ctrl-1}$ was 3.287V (which corresponds to $I_{ctrl-1}$ of 3.287×500/5 A).

Comparison Example 2

In Comparison Example 2, the hardening was performed in the same manner as in Comparison Example 2 except for that the gap between the saddle-type receiving unit and the work was 7 mm.

Figure 10:
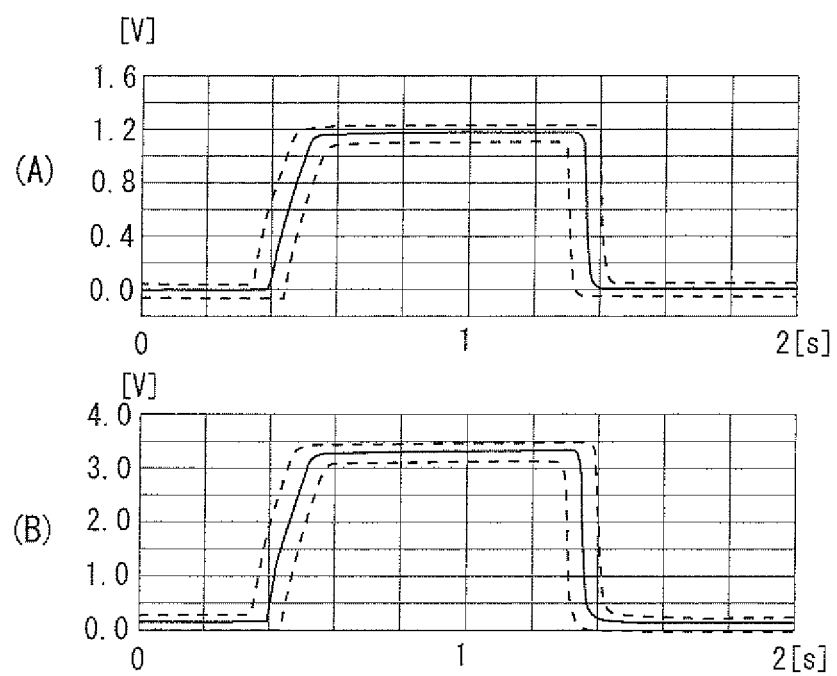
FIGS. 10(A) and 10(B) show the result of Comparison Example 2.

FIG. 10 shows the result of Comparison Example 2. FIG. 10(A) shows a signal waveform corresponding to the voltage in the heating coil 14. FIG. 10(B) shows a signal waveform corresponding to the primary-side current of the current transformer 13. In the drawings, the solid lines represent waveforms and the dotted lines represent the range of the upper-limit and lower-limit threshold values.

In Comparison Example 2, in spite of the gap wider than the reference gap of 4 mm, as can be seen from FIG. 10, the signal waveform of the voltage and the signal waveform of the primary-side current of the current transformer 13 were both at substantially the center of the upper-limit and lower-limit threshold values and thus the determination by the determination unit 23d was "fine". The output power and the output voltage from the high-frequency inverter 11 were 17 kW and 290V, respectively. The signal of the voltage $V_{coil}$ of the heating coil 14 was 1.166V (which corresponds to $V_{coil}$ of 1.166×200/5V) and the signal of the primary current $I_{ctrl-1}$ was 3.281V (which corresponds to $I_{ctrl-1}$ of 3.281×500/5 A).

TABLE 1

| | Gap between work and receiving unit [mm] | Output power [kW] | Determination unit | | |
|---|---|---|---|---|---|
| | | | Sv [V] | Si [V] | Determination result |
| Example 1 | 4.00 | 18 | 1.157 | 0.529 | Fine |
| Example 2 | 6.00 | 18 | 1.172 | 0.520 | Fine |
| Example 3 | 7.00 | 17 | 1.162 | 0.500 | Not Fine |
| Comparison Example 1 | 4.00 | 18 | 1.170 | 3.287 | Fine |
| Comparison Example 2 | 7.00 | 17 | 1.166 | 3.281 | Fine |

Table 1 shows the results of Examples 1 to 3 and Comparison Examples 1 and 2. The results as shown below are obtained, in the induction hardening system 1, when a case as in Illustrative Embodiments 1 to 3 where the wiring between the high-frequency inverter 11 and the matching capacitor 12 is electrically connected to the current sensor 21 is compared with a case as in Comparison Examples 1 and 2 where the wiring between the high-frequency inverter 11 and the matching capacitor 12 is electrically connected to the primary-side of the current transformer 13.

When the output current $I_o$ from the high-frequency inverter 11 is detected as in Examples 1 to 3, when the gap is increased from the reference value of 4 mm through 6 mm to 7 mm in this order, the signal $S_i$ of the output current $I_o$ detected by the current sensor 21 changes, when being converted to a voltage, from 0.529V through 0.520V to 0.500V. When the change rate from a case where the reference value is 4 mm is calculated, the change rate is about −1.7% when the gap is 6 mm and the change rate is about −5.5% when the gap is 7 mm. Thus, the determination unit 23d can determine a deviation from ±3.8% of the upper-limit and lower-limit threshold values (which is ±20 mV when being converted to a voltage).

On the other hand, when the gap is increased from the reference value of 4 mm to 7 mm as in Comparison Examples 1 and 2, the output power (the value shown by the meter) increases from 18 kW to 17 kw. Thus, in spite of the change of about −5.5% of the signal $S_i$ of the detected current, the current $I_{ctrl-1}$ in the determination unit 23d is substantially the same that in the case where the gap is 4 mm. This is within the range of threshold values. Thus, the determination unit 23d determines "fine". Thus, when the primary-side current of the current transformer 13 is detected as in Comparison Examples 1 and 2, the induction hardening cannot be monitored accurately.

The reason of this will be considered below. Since the comparison examples monitor the primary current $I_{ctrl-1}$ as a target, this is given by an equivalent circuit configuration of the vector synthesis of the effective current flowing in the parallel resistance and the reactive current flowing in the parallel inductance ($=(I_R^2+I_L^2)^{1/2}$). Thus, a small change of the gap between the work 15 and the heating coil 14 causes a small change of inductance. Thus, in the case that the resonance sharpness Q is equal to or higher than 4 to 5, the above vector synthesis does not significantly change even when the effective current changes.

On the other hand, since in the present invention the effective current is detected, a change of a parallel resistance due to a change of the gap is directly and proportionally reflected on the detection current. Therefore, a change of the monitoring current can be detected easily.

Example 4

The induction hardening system 1 shown in FIG. 1 was used to perform a load evaluation test. A saddle-type coil was used as the heating coil and a work was used as a hardening processing target. FIG. 11 is a diagram showing the positional relation between the heating coil 61 and a bar-like member as the work 50. In FIG. 11, the same or corresponding members as those of FIG. 24 are denoted with the same reference numerals.

As shown, the work 50 as a heating target is configured so that the bar-like base portion 51 includes the extension portion 52 in a coaxial manner. Thus, the bar-like base portion 51 and the extension portion 52 form a substantially L-like cross section. It was assumed that the portion of the heating coil 61 opposed to the straight portion 61b had a size a and the portion of the heating coil 61 opposed to the semicircular portion 61a had a size b. It was also assumed that the distance between the semicircular portion 61a of the heating coil 61 and the upper face 53 of the work 50, i.e., the coil gap, was d. Such a high-frequency inverter 11 was used that outputs high frequency having a frequency of 10 kHz and for which the output power can be controlled to be constant without depending on the load. As a parallel resonance-type load circuit, the matching capacitor 12 in which four pieces of 4.15 μF were parallelly connected and the current transformer 13 having a turn ratio of 8:1 were used.

The heating coil 61 was placed to the work so that the coil gap d was 1.5, 1.7, 1.9, 2.1, 2.3, and 2.5 mm, respectively. Then, at each coil gap d, while the work 50 is being rotated around the axis at a speed of 500 rpm, high-frequency power of 150 kW was inputted for 5.5 seconds to thereby perform a hardening processing.

In Example 4, the numerical value of the reference range of the load impedance was set in the determination unit 23d in advance. The reference range of the load impedance was set so that the upper limit was 1.78Ω and the lower limit was 1.712Ω. Furthermore, the output current from the high-frequency inverter was measured. The reference range of the output current $I_o$ was set so that the upper limit was 290 A and the lower limit was 250 A.

Figure 12:
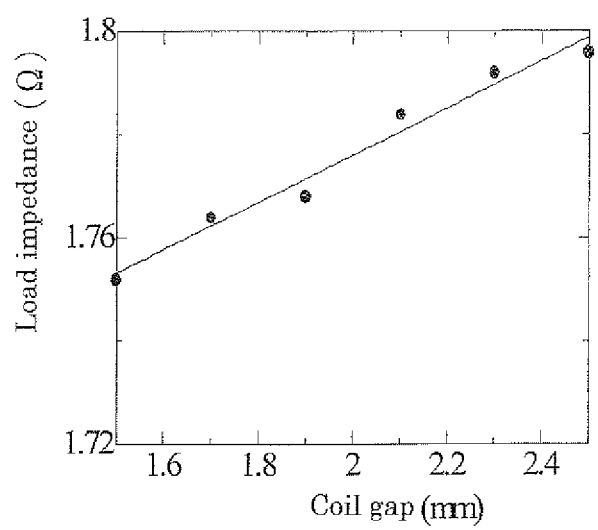
FIG. 12 is a diagram showing the coil gap dependency of the load impedance in the result of Example 4.
Figure 13:
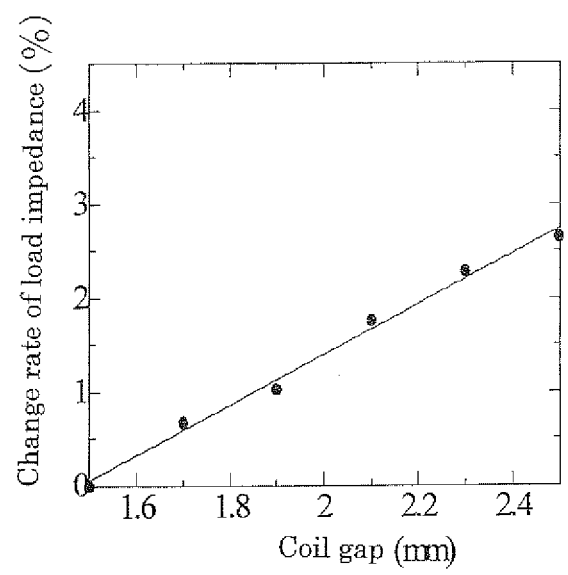
FIG. 13 is a diagram showing the coil gap dependency to the load impedance change rate in the result of Example 4.
Figure 14:
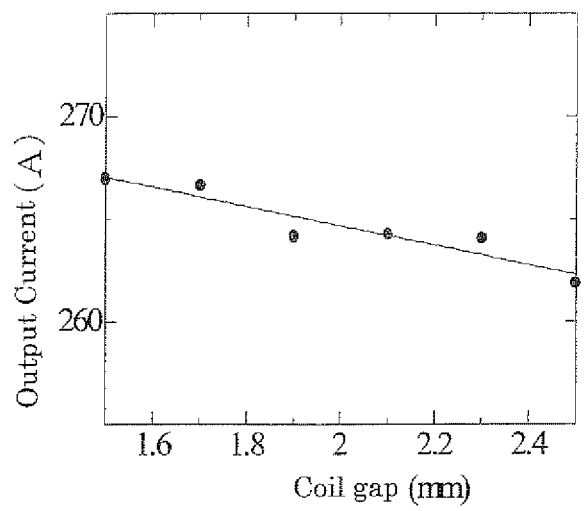
FIG. 14 is a diagram showing the coil gap dependency of the output current from the high-frequency inverter in the result of Example 4.
Figure 15:
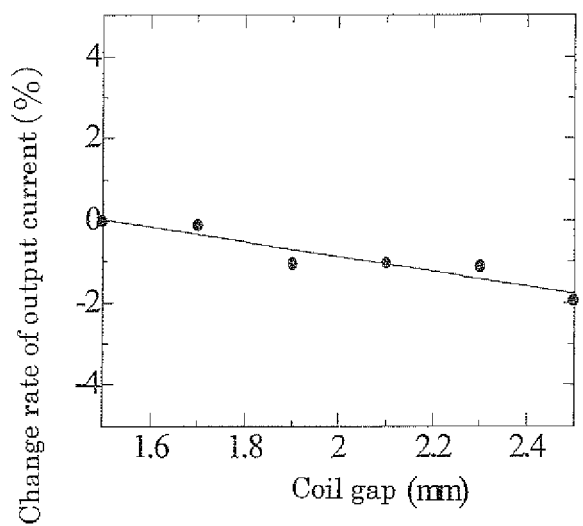
FIG. 15 is a diagram showing the coil gap dependency of the change rate of the output current from the high-frequency inverter in the result of Example 4.

The following section will describe the result of Example 4. FIG. 12 is a diagram showing the coil gap dependency of the load impedance in the result of Example 4. FIG. 13 is a diagram showing the coil gap dependency to the load impedance change rate. FIG. 14 is a diagram showing the coil gap dependency of the output current from the high-frequency inverter. FIG. 15 is a diagram showing the coil gap dependency of the change rate of the output current from the high-frequency inverter. In the drawings, all of the horizontal axes represent a coil gap. The vertical axis in FIG. 12 represents the load impedance. The vertical axis in FIG. 13 represents the load impedance change rate. The vertical axis in FIG. 14 represents the output current from the high-frequency inverter. The vertical axis in FIG. 15 represents the change rate of the output current from the high-frequency inverter. The change rate of each value was calculated, when assuming that the value at the coil gap d was f(d), by centuplicating the formula (f(d)−f(1.5))/f(1.5).

As can be seen from FIG. 12, the load impedance is 1.752Ω when the coil gap d has the standard value of 1.5 mm. However, with an increase of d, the load impedance linearly increases. When d is 2.1 mm, the load impedance exceeds the upper limit of the reference range. As can be seen from FIG. 13, the change rate of the load impedance increases by about 1.8% when d is 2.1 and increases to 2.6% when d is 2.5 mm.

As can be seen from FIG. 14, the output current from the high-frequency inverter is about 267 A when the coil gap d has the standard value of 1.5 mm. However, with an increase of d, the output current from the high-frequency inverter linearly decreases and decreases to about 262 A when d is 2.5 mm. As can be seen from FIG. 15, the change rate of the output current decreases by 1.9% when d is 2.5 mm.

Figure 16:
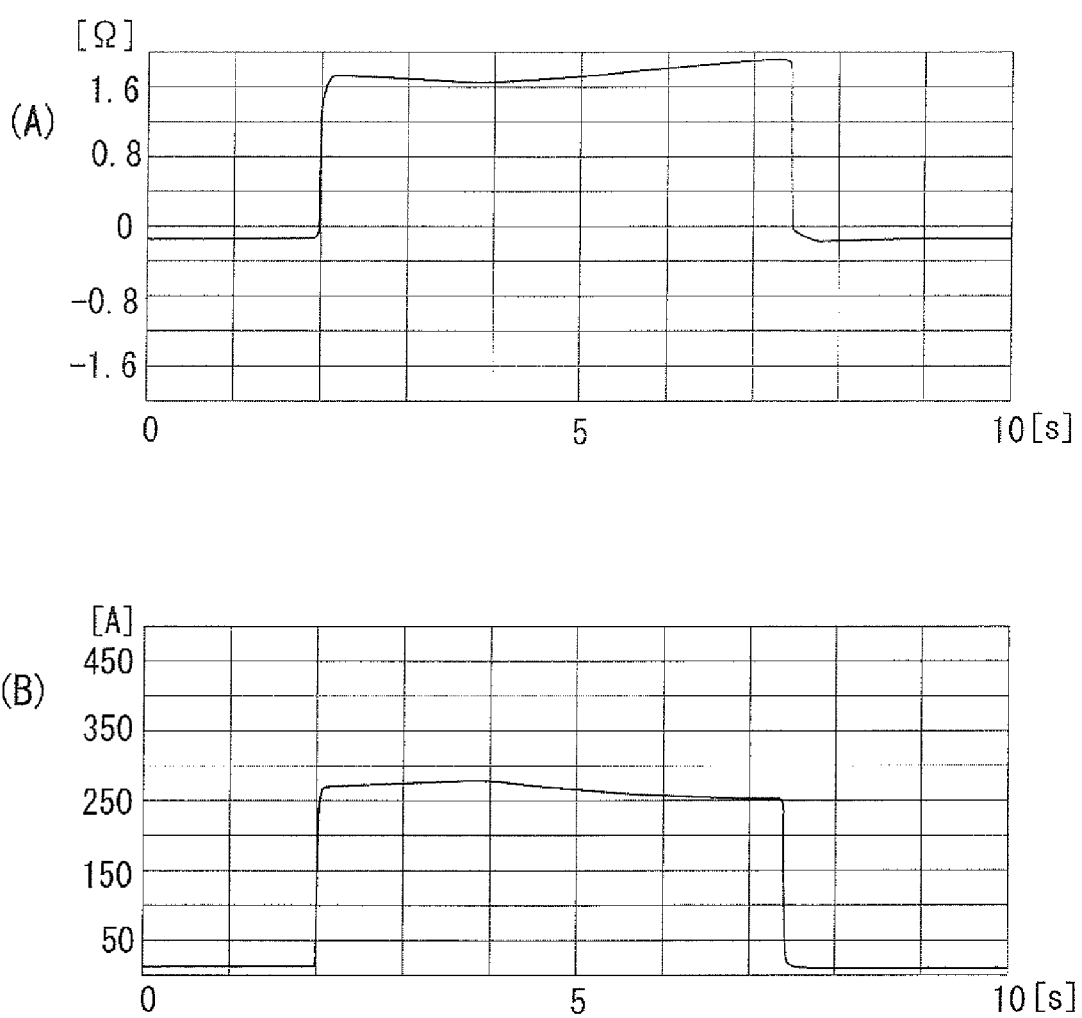
FIG. 16 shows waveforms when the coil gap d is 1.5 mm in the result of Example 4.
Figure 17:
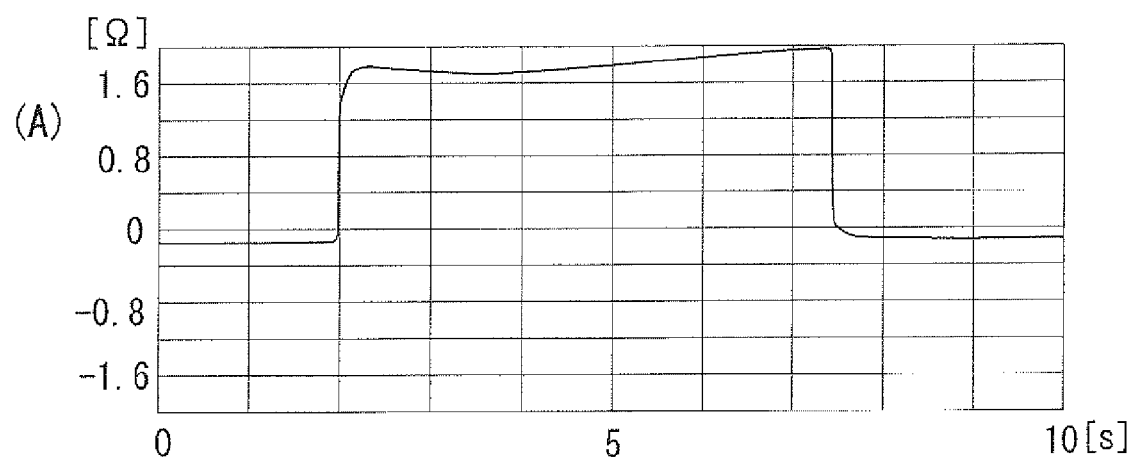
FIG. 17 shows waveforms when the coil gap d is 2.1 mm in the result of Example 4.
Figure 17:
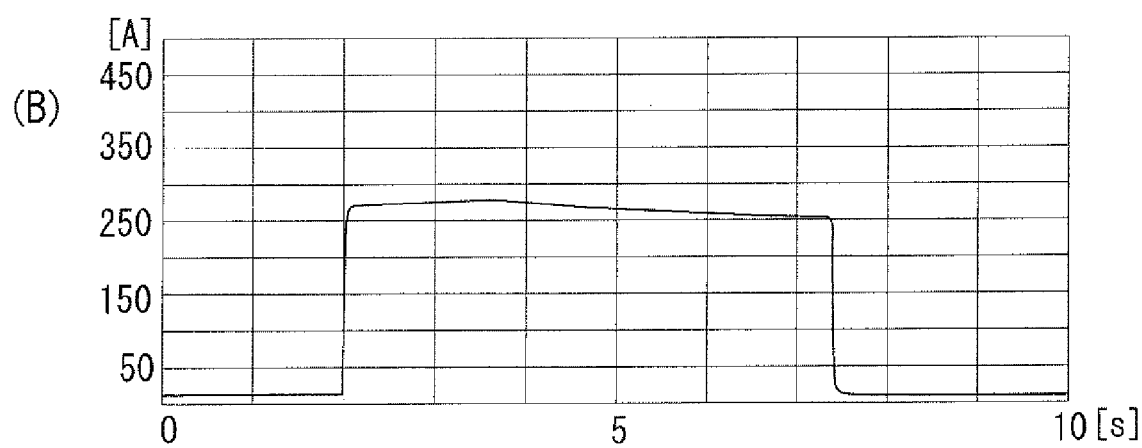

FIG. 16 shows the waveform when the coil gap d is 1.5 mm. FIG. 16(A) shows the waveform of the load impedance. FIG. 16(B) shows the waveform of the output current. FIG. 17 shows the waveform when the coil gap d is 2.1 mm. FIG. 17(A) shows the waveform of the load impedance. FIG. 17(B) shows the waveform of the output current. As can be seen, in both of the case where the coil gap d is 1.5 mm and the case where the coil gap d is 2.1 mm, the load impedance rapidly increases by the start of the induction hardening and then slightly decreases to subsequently increase. In accordance with this, it can be seen that the output current rapidly increases by the start of the induction hardening and then slightly increases to subsequently slightly decrease. A similar tendency was found when the coil gap d was 1.7 mm, 1.9 mm, 2.3 mm, and 2.5 mm.

The above result shows that the change rate of the load impedance to the coil gap d has an absolute value higher than that of the change rate of the output current to the coil gap d. This shows that, when an induction hardening processing is performed, the induction hardening processing is preferably monitored by measuring the load impedance. By monitoring the output current $I_o$ from the high-frequency inverter, the stability of the high-frequency inverter 11 can be inferred.

Comparison Example 3

Next, Comparison Example 3 is shown.

Comparison Example 3 is different from Example 4 in that the load impedance is not used for monitoring and the coil voltage and the output current from the high-frequency inverter are measured for monitoring. The other conditions are the same as those of Illustrative Embodiment 4.

Regarding the hardening monitoring, the determination unit 23d was set with the reference range of the coil voltage and the current $I_o$ in advance. In detail, the work 50 was placed in a predetermined standard status and then the work 50 was subjected to hardening. Then, the current sensor 21 and the voltage sensor 22 were used to sample the respective waveforms of the current signal $S_i$ and the voltage signal $S_v$. Then, it was confirmed that the quality was within the predetermined range. Then, the respective sampled waveforms were used as a reference waveform to set an upper limit and a lower limit for the voltage value along the vertical axis and the time along the horizontal axis along the respective reference waveforms. Then, the upper limit of the coil voltage $V_{coil}$ was set to 61V and the lower limit was set to 55V. The upper limit of the output current $I_o$ was set to 290 A and the lower limit was set to 250 A.

Figure 18:
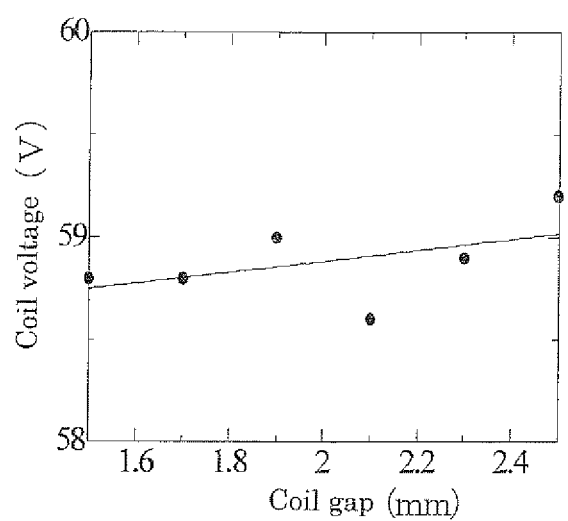
FIG. 18 is a diagram showing the coil gap dependency of the coil voltage in the result of Comparison Example 3.
Figure 19:
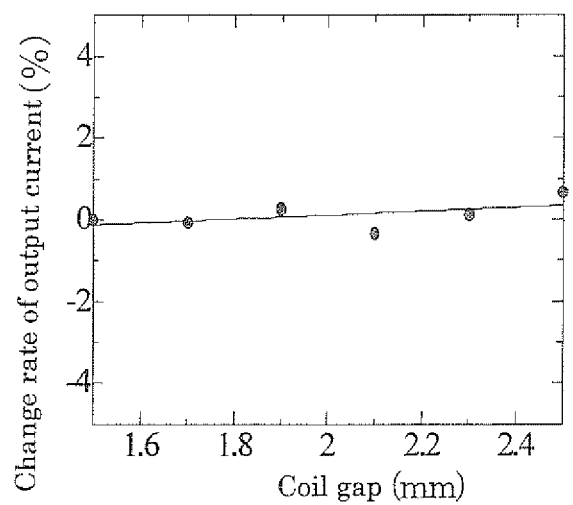
FIG. 19 is a diagram showing the coil gap dependency on the change rate of the coil voltage in the result of Comparison Example 3.
Figure 20:
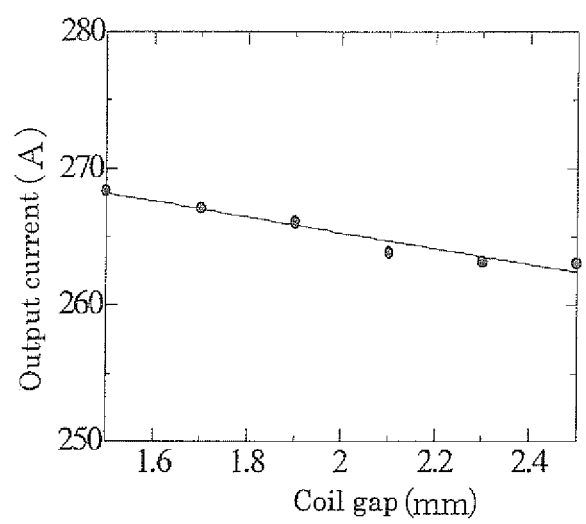
FIG. 20 is a diagram showing the coil gap dependency of the output current from the high-frequency inverter in the result of Comparison Example 3.
Figure 21:
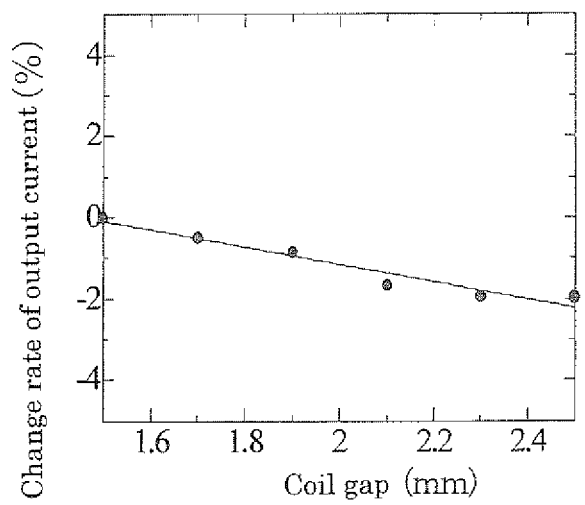
FIG. 21 is a diagram showing the coil gap dependency of the change rate of the output current from the high-frequency inverter in the result of Comparison Example 3.

The following section will describe the result of Comparison Example 3. FIG. 18 is a diagram showing the coil gap dependency of the coil voltage. FIG. 19 is a diagram showing the coil gap dependency to the change rate of the coil voltage. FIG. 20 is a diagram showing the coil gap dependency of the output current from the high-frequency inverter. FIG. 21 is a diagram showing the coil gap dependency of the change rate of the output current from the high-frequency inverter. In the drawings, all of the horizontal axes represent a coil gap. In FIG. 18, the vertical axis represents a coil voltage. In FIG. 19, the vertical axis represents the change rate of the coil voltage. In FIG. 20, the vertical axis represents the output current from the high-frequency inverter. In FIG. 21, the vertical axis represents the change rate of the output current from the high-frequency inverter. The change rate was calculated as in the illustrative embodiments.

As can be seen from FIG. 18, the coil voltage is 58.8V when the coil gap d has the standard value of 1.5 mm. However, with an increase of d, the coil voltage linearly increases and is about 59.2V when d is 2.5 mm. As can be seen from FIG. 19, the change rate of the coil voltage increases to 0.68% when d is 2.5 mm.

As can be seen from FIG. 20, the output current from the high-frequency inverter is about 268.4 A when the coil gap d has the standard value of 1.5 mm. However, with an increase of d, the coil voltage linearly decreases and decreases to about 263 A when d is 2.5 mm. As can be seen from FIG. 21, the change rate of the output current decreases by about 1.9% when d is 2.5 mm.

Figure 22:
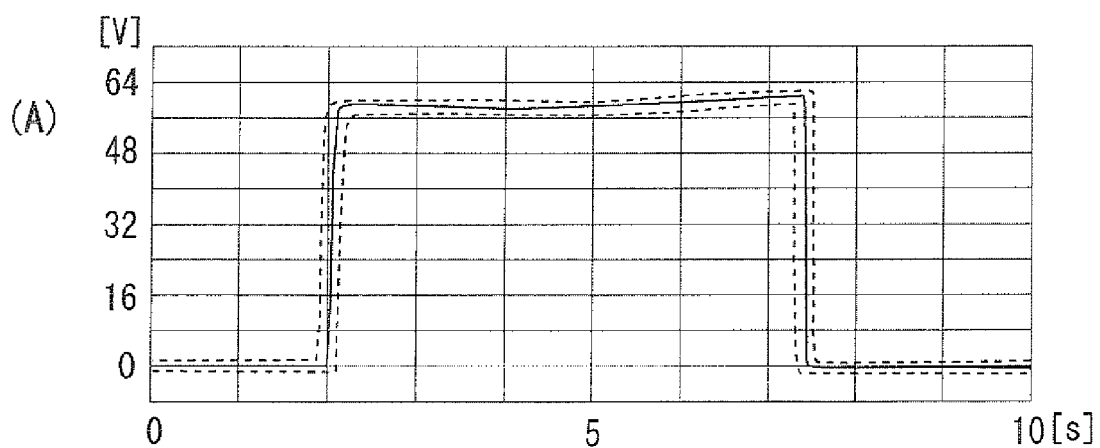
FIG. 22 shows waveforms when the coil gap d is 1.5 mm in the result of Comparison Example 3.
Figure 22:
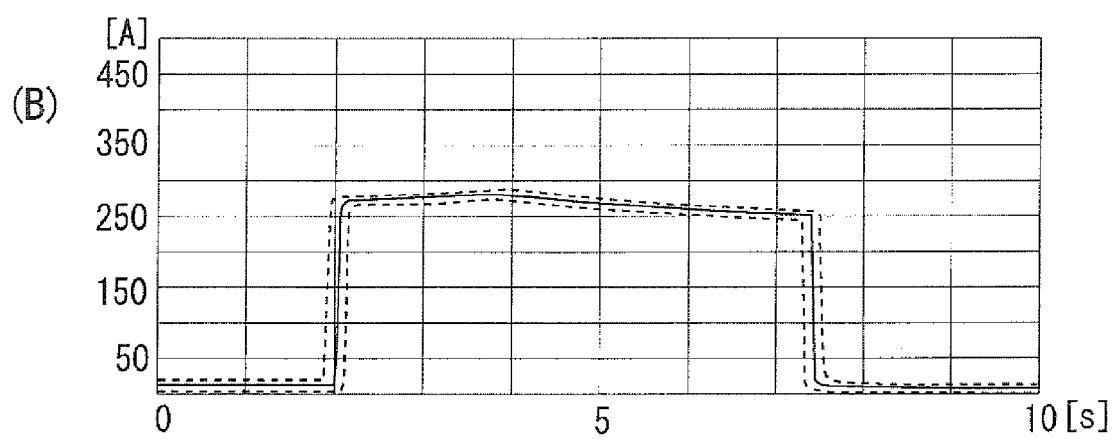
Figure 23:
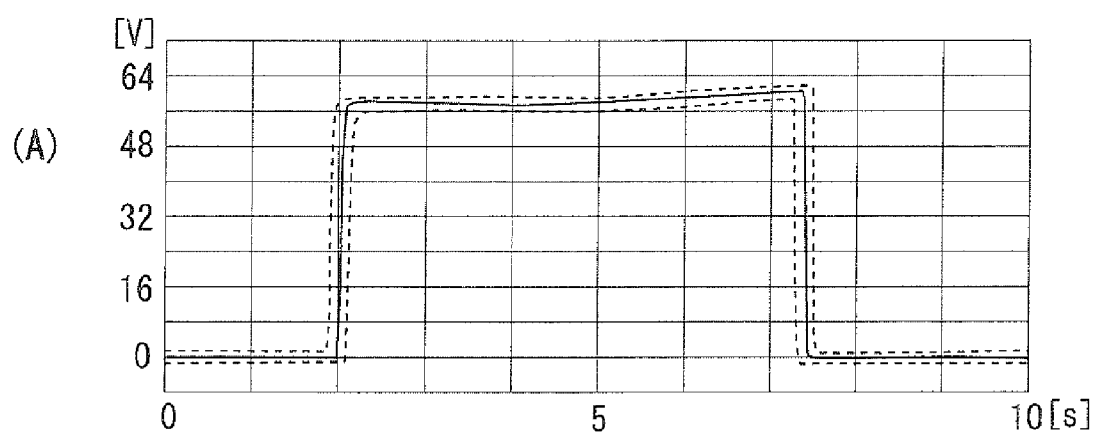
FIG. 23 shows waveforms when the coil gap d is 2.1 mm in the result of Comparison Example 3.
Figure 23:
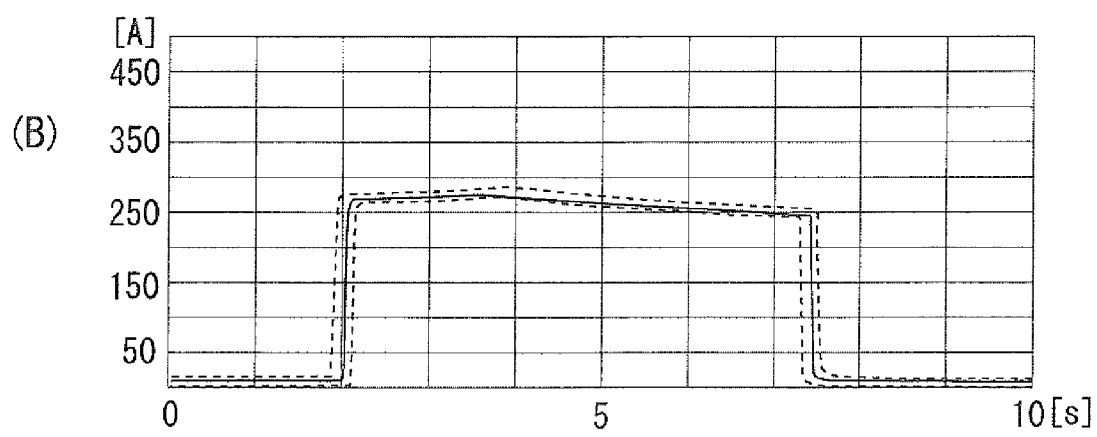

FIG. 22 shows the waveform when the coil gap d is 1.5 mm. FIG. 22(A) shows the waveform of the coil voltage. FIG. 22(B) shows the waveform of the output current. FIG. 23 shows the waveform when the coil gap d is 2.1 mm. FIG. 23(A) shows the waveform of the coil voltage. FIG. 23(B) shows the waveform of the output current. In the drawings, the solid lines show the respective waveforms and the dotted lines show upper limits and lower limits of the range of threshold values. As can be seen from FIG. 22, when the coil gap d is 1.5 mm, the voltage waveform was almost at the neighborhood of the center of the upper-limit and lower-limit threshold values. However, when the coil gap d is 2.1, as can be seen from FIG. 23, the voltage waveform was almost at the neighborhood of the center of the upper-limit and lower-limit threshold values but the current waveform was not within the range of the threshold values. Thus, the determination by the determination unit 23*d* was "fine" when the coil gap d was 1.5 mm but was "not fine" when the coil gap d was 2.1 mm. It is considered that the reason why the coil voltage $V_{coil}$ and the output current $I_o$ change in the case that an induction heating is started without changing the coil gap d is that the heating suppresses the work from being induction-heated.

As can be seen from the result of Comparison Example 3, an increase of the coil gap d of 1 mm causes a decrease of about 2% of the output current $I_o$ and an increase of about 0.7% of the coil voltage $V_{coil}$. The change rates are smaller when compared with the change rates of the load impedance of Example 4.

As described above, the comparison of Example 4 with Comparison Example 3 showed that the monitoring of the load impedance is more effective than the monitoring of the output current $I_o$ and the coil voltage $V_{coil}$. Although the above section has described a bar-like member as a work, the invention is effective as a monitoring means when a structure in which a work has a connected portion in a direction crossing an axis portion, e.g., a flange or the neighborhood of the flange, is subjected to a hardening processing. The reason is that, with an increase of the distance between a hardening target region in the work and a heating coil, a straight portion shows no change in a hardening processing but a semicircular portion shows a poor hardening processing, as shown in FIG. 12.

What is claimed is:

1. An induction hardening monitoring apparatus that can be connected to an induction hardening apparatus in which a high-frequency inverter is connected to a capacitor and a heating coil, and in which a current transformer is provided between the capacitor and the heating coil, comprising:
    a current sensor for detecting output current from the high-frequency inverter;
    a voltage sensor for detecting a voltage generated in the heating coil; and
    a controller for monitoring a hardening processing based on a detection signal from the current sensor and a detection signal from the voltage sensor,
    wherein the controller monitors the hardening processing based on a preset sensor configuration, said sensor configuration being that the current sensor is electrically connected to a wire between the high-frequency inverter and the capacitor, and the voltage sensor has terminals connected to the heating coil at both ends in parallel.

2. The induction hardening monitoring apparatus according to claim 1,
    wherein the high-frequency inverter is parallely connected to the capacitor and the heating coil.

3. The induction hardening monitoring apparatus according to claim 2,
    wherein the controller includes a current measurement circuit for calculating an effective value of the output current from the high-frequency inverter based on the detection signal from the current sensor and a voltage measurement circuit for calculating an effective value of the voltage generated in the heating coil based on the detection signal from the voltage sensor; and wherein the controller monitors a hardening processing based on the effective values calculated by the current measurement circuit and the voltage measurement circuit, respectively.

4. The induction hardening monitoring apparatus according to claim 3,
    wherein the controller includes a determination unit for determining whether effective values calculated by the current measurement circuit and the voltage measurement circuit, respectively, are within a set range or not.

5. The induction hardening monitoring apparatus according to claim 1,
    wherein the controller calculates a load impedance based on the detection signal from the current sensor and the detection signal from the voltage sensor and monitors a hardening processing based on the calculated load impedance.

6. The induction hardening monitoring apparatus according to claim 5,
    wherein the controller calculates output current from the high-frequency inverter based on the detection signal from the current sensor and monitors a hardening processing based on the calculated output current.

7. The induction hardening monitoring apparatus according to claim 5,
    wherein the controller includes a current measurement circuit for calculating an effective value of the output current from the high-frequency inverter based on the detection signal from the current sensor and a voltage measurement circuit for calculating an effective value of the voltage generated in the heating coil based on the detection signal from the voltage sensor; and wherein the controller calculates a load impedance based on the effective values calculated by the current measurement circuit and the voltage measurement circuit, respectively.

8. The induction hardening monitoring apparatus according to claim 7,
    wherein the controller includes a determination unit for determining whether the calculated load impedance is within a set range or not.

9. A monitoring device for monitoring an induction hardening apparatus that comprises a transformer, an inverter connected to a primary side of the transformer, a heating coil connected to a secondary side of the transformer, and a capacitor connected to the primary side of the transformer and to the inverter in parallel, the monitoring device comprising:
- a current sensor that measures a current and outputs a signal corresponding to the measured current;
- a voltage sensor that measures a voltage and outputs a signal corresponding to the measured voltage; and
- a controller communicating with said current sensor and said voltage sensor, the controller performing processing on said signals from the current sensor and from the voltage sensor in accordance with a preset sensor configuration for the induction hardening apparatus to monitor a hardening process of the induction hardening apparatus, said preset sensor configuration being that said current sensor is measuring a current on a wire connecting the inverter to the capacitor, and said voltage sensor is measuring a voltage across terminals of the hearing coil.

10. An induction hardening system, comprising:
- an induction hardening apparatus that includes a transformer, an inverter connected to a primary side of the transformer, a heating coil connected to a secondary side of the transformer, and a capacitor connected to the primary side of the transformer and to the inverter in parallel; and
- a current sensor operatively coupled to the induction hardening apparatus so as to measure a current on a wire connecting the inverter to the capacitor and output a signal corresponding to the measured current;
- a voltage sensor operatively coupled to the induction hardening apparatus so as to measure a voltage across terminals of the hearing coil and output a signal corresponding to the measured voltage; and
- a controller communicating with said current sensor and said voltage sensor, the controller performing processing on said signals from the current sensor and from the voltage sensor to monitor a hardening process.

* * * * *